(12) United States Patent
Sterling et al.

(10) Patent No.: US 9,623,809 B2
(45) Date of Patent: Apr. 18, 2017

(54) VEHICLE STORAGE COMPARTMENT ASSEMBLY

(71) Applicant: Nissan North America, Inc., Franklin, TN (US)

(72) Inventors: Shawn Sterling, Livonia, MI (US); Robert Speights, Nashville, TN (US)

(73) Assignee: Nissan North America, Inc., Franklin, TN (US)

( * ) Notice: Subject to any disclaimer, the term of this patent is extended or adjusted under 35 U.S.C. 154(b) by 157 days.

(21) Appl. No.: 14/679,121

(22) Filed: Apr. 6, 2015

(65) Prior Publication Data

US 2016/0288727 A1    Oct. 6, 2016

(51) Int. Cl.
*B60R 5/04* (2006.01)
*B60R 9/06* (2006.01)

(52) U.S. Cl.
CPC ..................... *B60R 9/065* (2013.01)

(58) Field of Classification Search
CPC ............ B60R 11/06; B60R 9/00; B60R 13/01
USPC ......................................................... 224/404
See application file for complete search history.

(56) References Cited

U.S. PATENT DOCUMENTS

| | | |
|---|---|---|
| 3,727,971 A | 4/1973 | Sisler |
| 4,705,317 A | 11/1987 | Henri |
| 5,303,969 A | 4/1994 | Simnacher |
| 5,615,922 A | 4/1997 | Blanchard |
| 5,848,818 A | 12/1998 | Flueckinger |
| RE36,073 E * | 2/1999 | Kremer ................. B60P 7/0807 296/39.2 |
| 6,003,923 A * | 12/1999 | Scott ....................... B60R 11/06 296/37.6 |
| 6,139,080 A | 10/2000 | Saffold |
| 6,203,087 B1 * | 3/2001 | Lance ..................... B60R 11/06 224/403 |
| 6,464,276 B1 | 10/2002 | Gruich |
| 6,814,397 B2 | 11/2004 | Henderson et al. |
| 6,886,876 B1 * | 5/2005 | Damian .................... B60R 9/00 224/404 |
| 7,431,368 B2 * | 10/2008 | Henderson ................ B60R 5/00 296/37.6 |
| 7,562,925 B2 | 7/2009 | Henderson et al. |
| 7,651,146 B2 | 1/2010 | Anderson et al. |
| 7,931,324 B2 | 4/2011 | Henderson et al. |
| 8,052,019 B2 * | 11/2011 | Plavetich .................. B60P 3/06 224/403 |

(Continued)

*Primary Examiner* — Adam Waggenspack
(74) *Attorney, Agent, or Firm* — Global IP Counselors, LLP

(57) ABSTRACT

A storage compartment assembly has a main body including an inboard panel and an outboard panel defining a storage compartment therebetween. With the storage compartment assembly installed to a side wall, at least a first portion of the main body extends under an overhanging portion of the side wall and a second portion of the main body extends inboard relative to the overhanging portion over an area of a cargo area floor. An upper end of the first portion of the storage compartment assembly includes at least one upwardly extending projection that extends upwardly adjacent to the overhanging portion within a space between the upper end of the side wall and a utility attachment track such that the utility attachment track restricts movement of the upper end in an inboard direction with the storage compartment assembly installed to the side wall.

10 Claims, 18 Drawing Sheets

(56) References Cited

U.S. PATENT DOCUMENTS

2014/0125083 A1\* 5/2014 Wise ................. B60R 13/01
                                                         296/39.1
2014/0153271 A1\* 6/2014 Sura .................. B60Q 3/06
                                                         362/485

\* cited by examiner

VEHICLE STORAGE COMPARTMENT ASSEMBLY

BACKGROUND

Field of the Invention

The present invention generally relates to a storage compartment assembly. More specifically, the present invention relates to a storage compartment assembly that can be installed and later removed from a cargo area of a vehicle.

Background Information

A pickup truck cargo area can include various features built into the side walls of the cargo area. Tool boxes for pickup trucks typically are generic assemblies that do not take cargo area features into consideration.

SUMMARY

One object of the disclosure is to provide a storage compartment assembly with features that complement the features and structures of a cargo area of a vehicle.

In view of the state of the known technology, one aspect of the present disclosure is to provide a vehicle storage compartment assembly with a vehicle body structure and a storage compartment assembly. The vehicle body structure includes a floor and a side wall that at least partially define a vehicle cargo area. The side wall has an upper end structured with an overhanging portion that extends inboard from the side wall above the floor. The overhanging portion includes a utility attachment track extending downward therefrom defining a space between an upper portion of the side wall and the utility attachment track. The storage compartment assembly has a main body including an inboard panel and an outboard panel spaced apart from one another and fixedly coupled to one another defining a storage compartment therebetween. The storage compartment assembly is moveable between an uninstalled orientation in which the main body is separated from the side wall and an installed orientation in which the outboard panel of the main body is directly fastened to the side wall. With the storage compartment assembly in the installed orientation at least a first portion of the main body extends under the overhanging portion and a second portion of the main body extends inboard relative to the overhanging portion over an area of the floor. An upper end of the first portion of the storage compartment assembly includes at least one upwardly extending projection that extends upwardly adjacent to the overhanging portion within the space between the upper end of the side wall and the utility attachment track such that the utility attachment track restricts movement of the upper end in an inboard direction with the storage compartment assembly in the installed orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
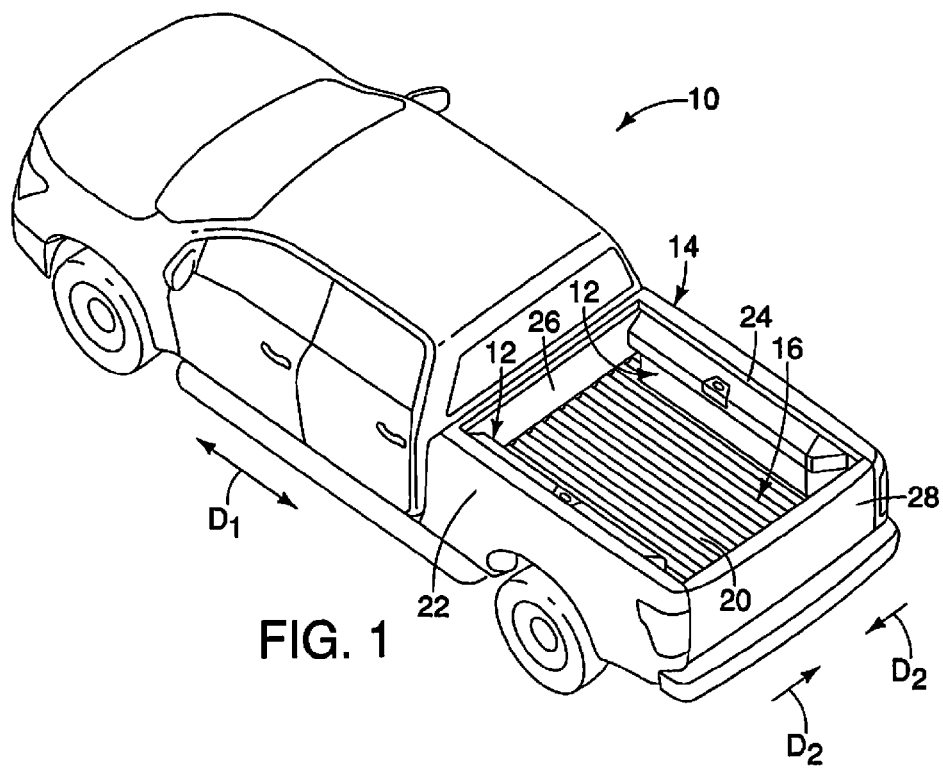
FIG. 1 is a perspective view of a vehicle with a rear structure including a floor, a front wall and a pair of side walls that define a cargo area with a pair of removable storage compartment assemblies installed within the cargo area in accordance with a first embodiment.

Referring initially to FIG. 1, a vehicle 10 is illustrated in accordance with a first embodiment. The vehicle 10 includes a pair of storage compartment assemblies 12. The storage compartment assemblies 12 are basically identical to one another, except that they are symmetrically arranged with respect to one another, at opposite sides of the vehicle 10. More specifically, the storage compartment assemblies 12 are mirror images of one another. The storage compartment assemblies 12 have identical features, and consequently, in the description below, the description of one storage compartment assembly 12 applies equally to both storage compartment assemblies 12. Hence, only of the storage compartment assemblies 12 is described in detail below following description of the vehicle 10, for the sake of brevity.

Figure 2:
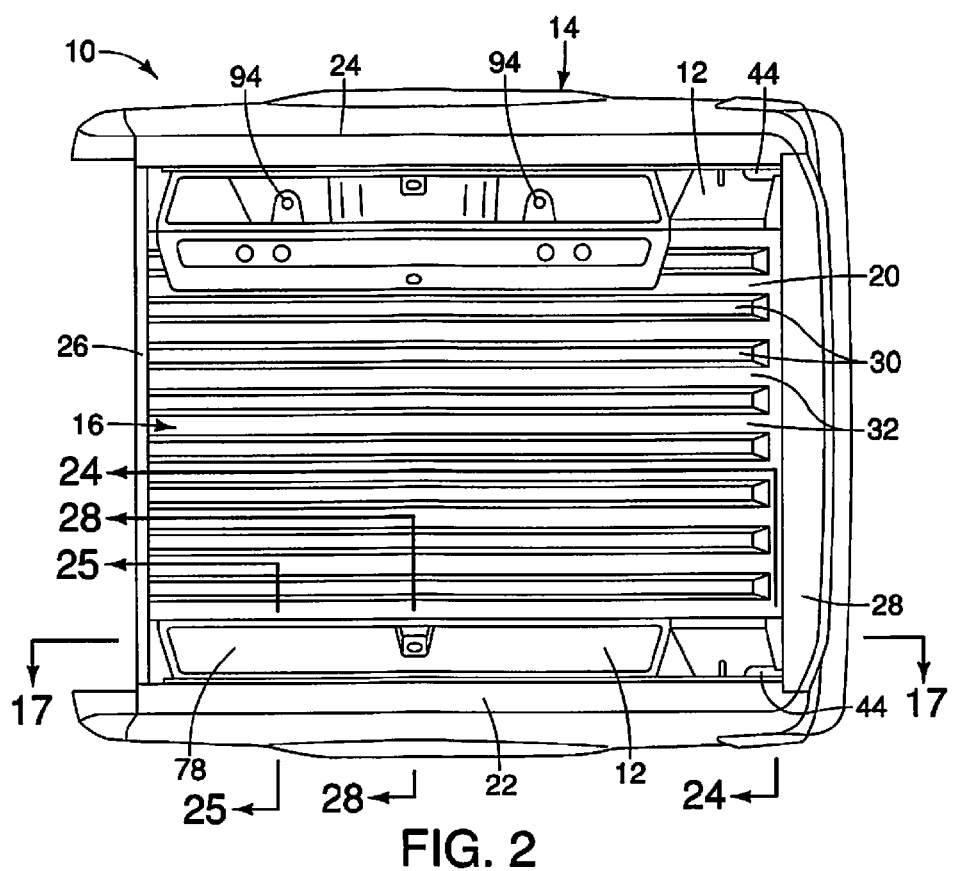
FIG. 2 is a top view of the rear structure that defines the cargo area removed from the vehicle showing the pair of storage compartment assemblies, with a lid on one of the storage compartment assemblies being in an open orientation and the lid on the other storage compartment assemblies being in a closed orientation in accordance with the first embodiment.
Figure 3:
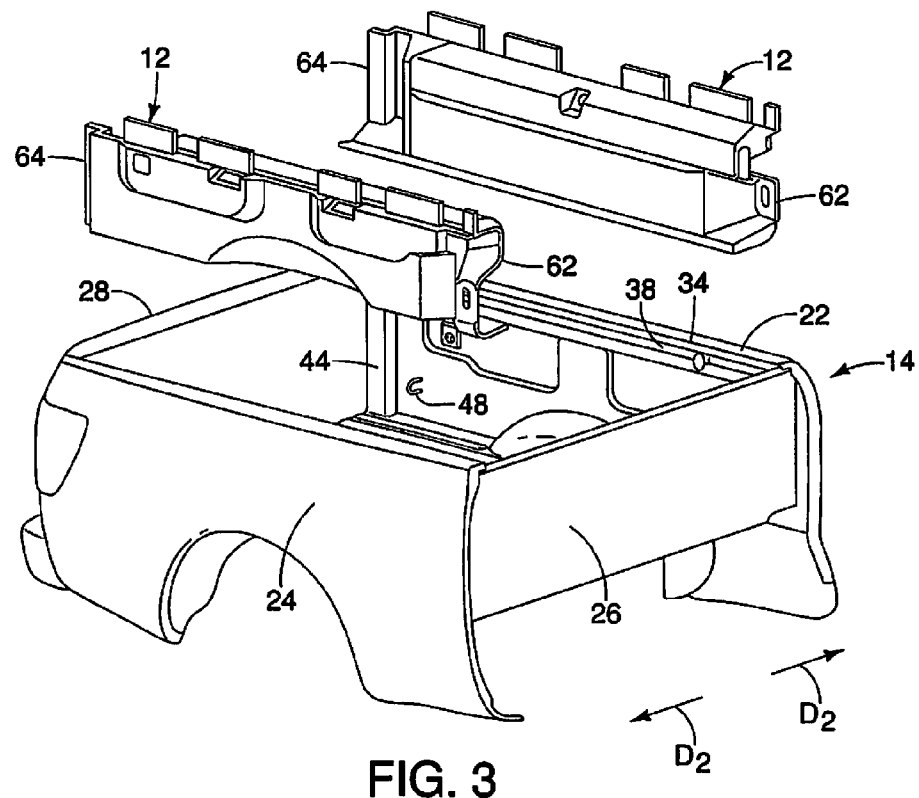
FIG. 3 is an exploded perspective view of the cargo area showing the pair of storage compartment assemblies removed from the cargo area in accordance with the first embodiment.

As shown in FIG. 1-3, the vehicle 10 is a pickup truck that includes a body structure 14 with a rear structure that defines a cargo area 16. Specifically, the body structure 14 includes a floor 20, side walls 22 and 24, a front wall 26 and a tailgate 28 that basically define the cargo area 16. The cargo area 16 is shown removed from the vehicle 10 in FIG. 2. As shown in FIG. 2, the floor 20 includes a plurality of embossments that define ribs 30 with recesses 32 defined between adjacent pairs of the ribs 30. The ribs 30 and the recesses 32 extend in a vehicle longitudinal direction $D_1$.

The side walls 22 and 24 are located on opposite lateral sides of the floor 20. Specifically, the side wall 22 is located on the driver's side of the vehicle 10 and the side wall 24 is located on the passenger's side of the vehicle 10, where the driver's side and the passenger's side are defined with respect to vehicle related conventions in North America.

Figure 4:
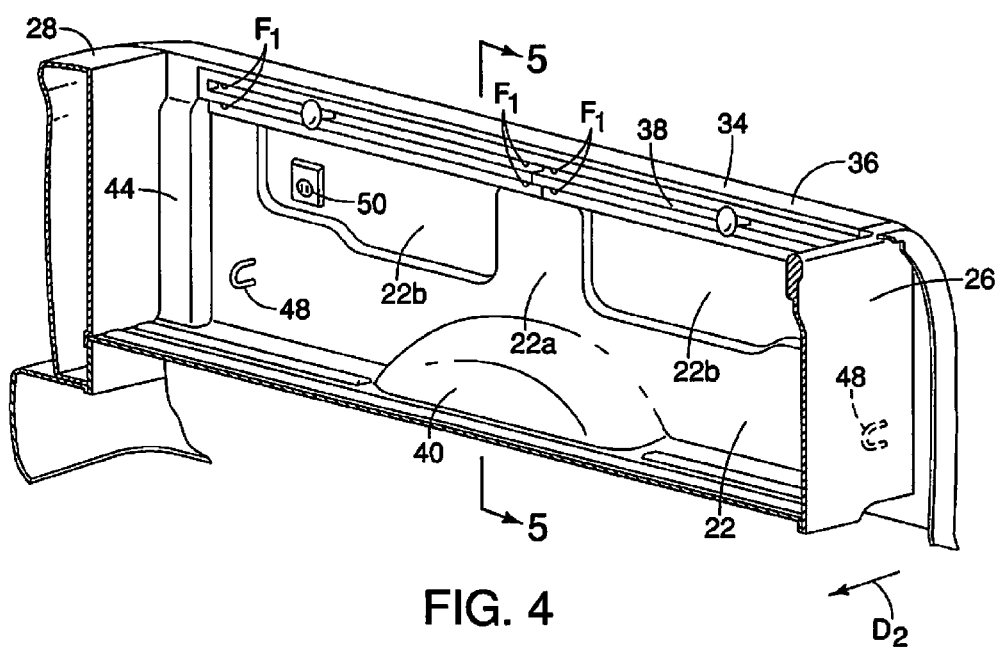
FIG. 4 is a perspective cross-sectional view of one of the side walls of the rear structure that defines the cargo area with the storage compartment assembly removed showing features of the side wall including a utility track and an electric outlet in accordance with the first embodiment.
Figure 5:
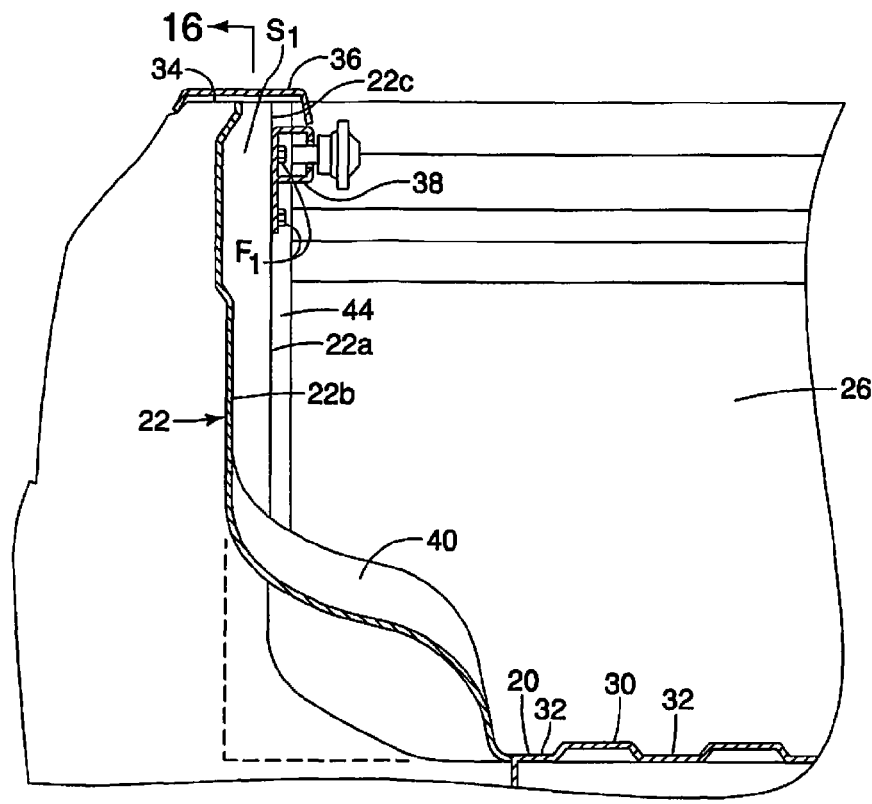
FIG. 5 is a cross-sectional view of the side wall and floor of the cargo area taken along the line 5-5 in FIG. 4 showing a wheel well, the utility track, and ribs, and recesses formed in the floor in accordance with the first embodiment.
Figure 19:
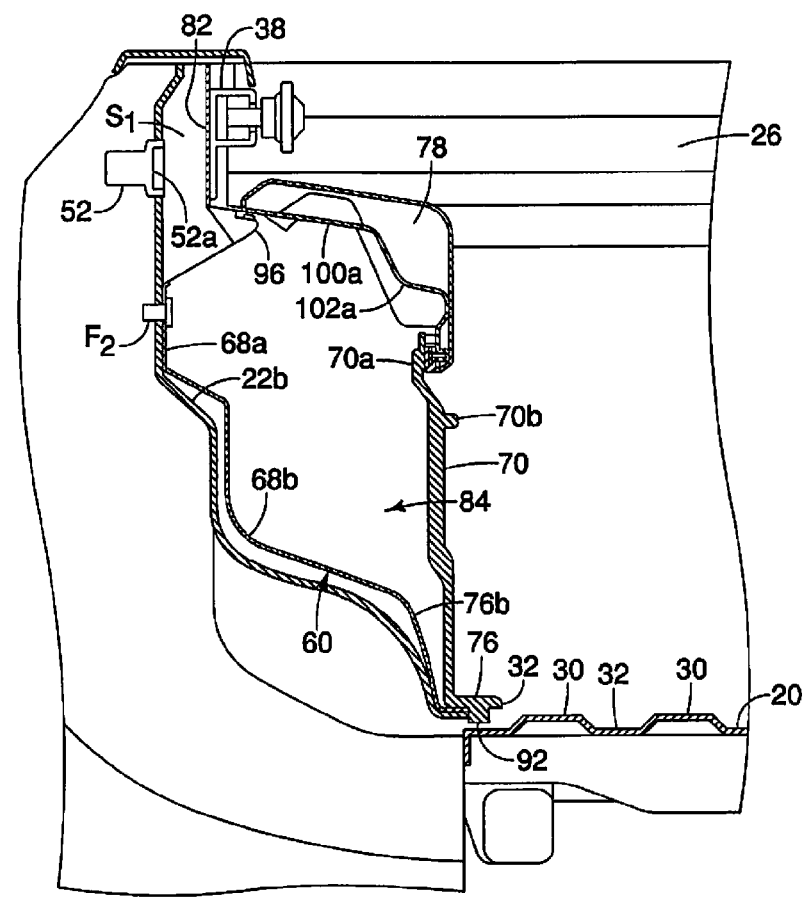
FIG. 19 is a cross-sectional view of the storage compartment assembly installed to the side wall of the cargo area taken along the line 19-19 in FIG. 6 showing details of the storage compartment assembly in accordance with the first embodiment.

The side wall 22 and side wall 24 are basically identical but are mirror images of one another. Therefore, description of the side wall 22 applies equally to the side wall 24. As shown in FIGS. 4, 5 and 19, the side wall 22 has an upper end 34 structured with an overhanging portion 36 that extends in an inboard direction $D_2$ from the side wall 22 above the floor 20. A utility attachment track 38 is attached to the side wall 22 adjacent to the overhanging portion 36 in a manner described in greater detail below.

As shown in FIG. 4, a wheel well 40 is formed along the floor 20 and the side wall 22. More specifically, the floor 20 and the side wall 22 include an area therebetween that defines the wheel well 40. The wheel well 40 extends upward into the vehicle cargo area 16 and has a curved shape corresponding to the wheel below (not shown).

Figure 16:
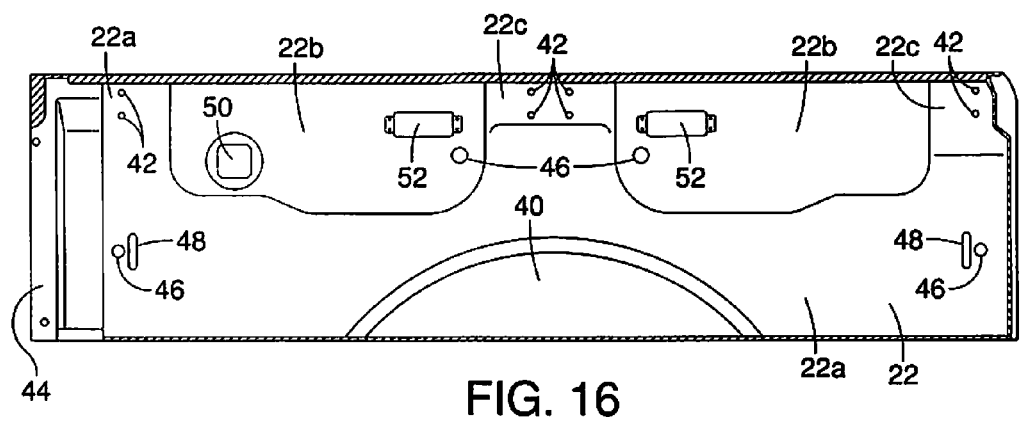
FIG. 16 is a cross-sectional view of the side wall of the cargo area taken along the line 16-16 in FIG. 5 with the storage compartment assembly removed showing details of the side wall in accordance with the first embodiment.

As is also shown in FIG. 4, the side wall 22 includes surface contours. Specifically, the side wall 22 includes a main portion 22a and at least two recessed areas 22b. As shown in FIG. 5, the two recessed areas 22b are located outboard of the main portion 22a. As shown in FIG. 16, the main portion 22a includes three upper sections 22c that are separated from one another by the two recessed areas 22b. The three upper sections 22c include track attachment openings 42. The three upper sections 22c are located inboard of the two recessed areas 22b. As shown in FIG. 5, the utility attachment track 38 is attached to upper ends 22c of the main portion 22a of the side wall 22 via fasteners $F_1$ that are installed through apertures in the utility attachment track 38 and into the track attachment openings 42. A more detailed description of the utility attachment track 38 can be found in, for example, U.S. Pat. No. 8,052,019, to Richard Plavetich, and U.S. Patent Application Publication No.

2014/0153271 to Sura et al., which are both incorporated herein by reference in their entirety.

As shown in FIG. 5, a space $S_1$ is defined between the recessed areas 22b of the side wall 22 and the utility attachment track 38 immediately below the overhanging portion 36.

The side wall 22 also includes a rear pillar 44, compartment attachment openings 46 (attachment structures), cargo rings 48, an electric outlet 50 (an electric fixture) and light fixtures 52 (additional electric fixtures shown in FIG. 16).

The rear pillar 44 at least partially defines an opening that receives the tailgate 28. Since tailgate structures are conventional, further description is omitted for the sake of brevity. The compartment attachment openings 46 shown in FIGS. 4 and 16 are for the purpose of attaching the storage compartment assembly 12, as is described in greater detail below. The cargo rings 48 are rigidly fixed to the side wall 22 and are provided as tie-down points for securing cargo within the cargo area 16. For example, a rope or other securing material can be looped through one or more of the cargo rings 48 in order to prevent cargo from moving during transport.

The electric outlet 50 is a fixture installed to the side wall 22 rearward of the wheel well 40 within the rearward one of the recessed areas 22b, between the wheel well 40 and the rear pillar 44. The electric outlet 50 can optionally be installed to the side wall 24. However, in the depicted embodiment, the electric outlet 50 is only installed to the side wall 22. The electric outlet 50 is electrically connected to the vehicle battery (not shown) and includes converter circuitry (not shown). The converter circuitry converts the direct current 12 volt electric power from the vehicle battery to alternating 110 volt power such that power tools or other electrically powered equipment can be supplied with electric power from the electric outlet 50.

In FIGS. 1-4, the light fixtures 52 are hidden from view behind the utility attachment track 38. In FIG. 5, the cross-section is cut in an area where the light fixtures 52 are not visible. However, as shown in FIGS. 16 and 19, the light fixtures 52 are shown fixed to the side wall 22. In the depicted embodiment there are two light fixtures 52, both located above the wheel well 40, but spaced apart from one another. As shown in FIG. 19, the light fixtures 52 are mounted to the side wall 22 and are at least partially located within the space $S_1$ between the upper end 34 of the side wall 22 and the utility attachment track 38. Further, as also shown in FIG. 19, the light fixtures 52 are located outboard relative to the utility attachment track 38.

The front wall 26 extends between forward ends of the side walls 22 and 24. Since the front wall 26 is a conventional pickup truck feature, further description is omitted for the sake of brevity.

The tailgate 28 is located at the rear of the cargo area 16 and is a conventional structure. Therefore further description of the tailgate 28 is omitted for the sake of brevity.

A detailed description of the storage compartment assembly 12 is now provided initially with specific reference to FIGS. 6-15 and 18-19. In FIGS. 6-7 and 18-19, the storage compartment assembly 12 is shown installed to the cargo area 16 of the vehicle 10 and attached to the side wall 22 in a manner described in greater detail below. In FIGS. 8-15, the storage compartment assembly 12 is shown removed from the side wall 22 and the cargo area 16.

The storage compartment assembly 12 has a box-like structure that includes a main body 60 (a storage compartment assembly). The main body 60 can be made of any of a variety of materials, such as, for example, sheet metal panels welded together, carbon-fiber-reinforced polymer materials, fiberglass, wood or wood fiber products. The main body 60 has a front end 62, a rear end 64, an upper end 66, an outboard panel 68, an inboard panel 70, a first side panel 72, a second side panel 74, a bottom panel 76, an upper lid 78, an accessory lid 80 and upwardly extending flanges 82. The outboard panel 68 and the inboard panel 70 are spaced apart from one another and fixedly coupled to one another via the first side panel 72, the second side panel 74 and the bottom panel 76 thereby defining storage space therebetween. More specifically, the outboard panel 68, the inboard panel 70, the first side panel 72, the second side panel 74 and the bottom panel 76 define a main storage compartment 84 and a utility storage compartment 86 (a side compartment section) that are described in greater detail below. Further, description of various features relating to the interior of the main body 60 is provided herein below following a description of various features visible along the exterior of the main body 60.

Figure 6:
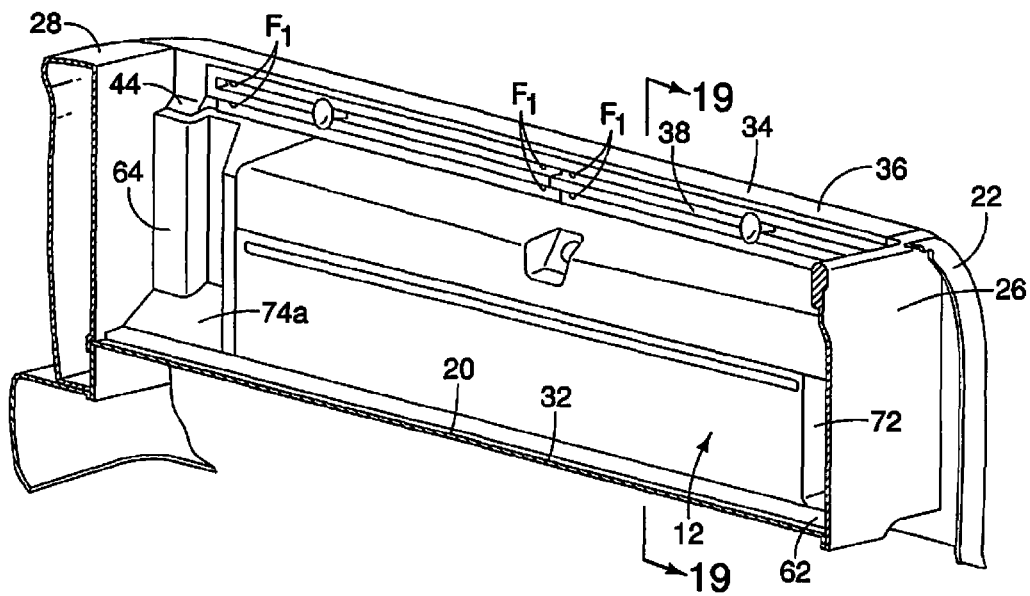
FIG. 6 is a perspective cross-sectional view of the cargo area from a rearward looking perspective showing the storage compartment assembly installed to the side wall in accordance with the first embodiment.
Figure 7:
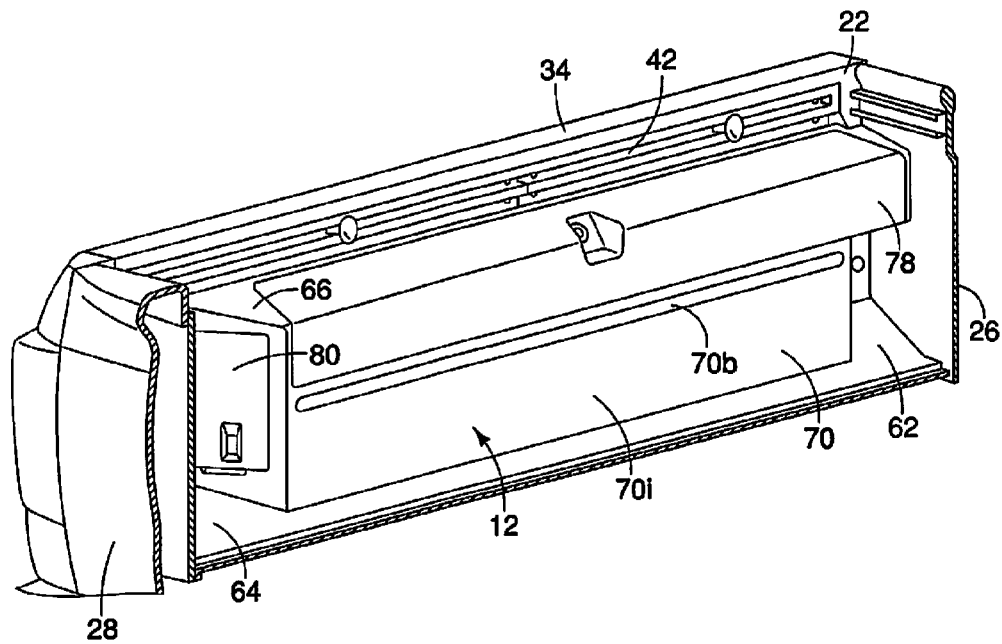
FIG. 7 is another perspective cross-sectional view of the cargo area from a forward looking perspective showing the storage compartment assembly installed to the side wall in accordance with the first embodiment.
Figure 8:
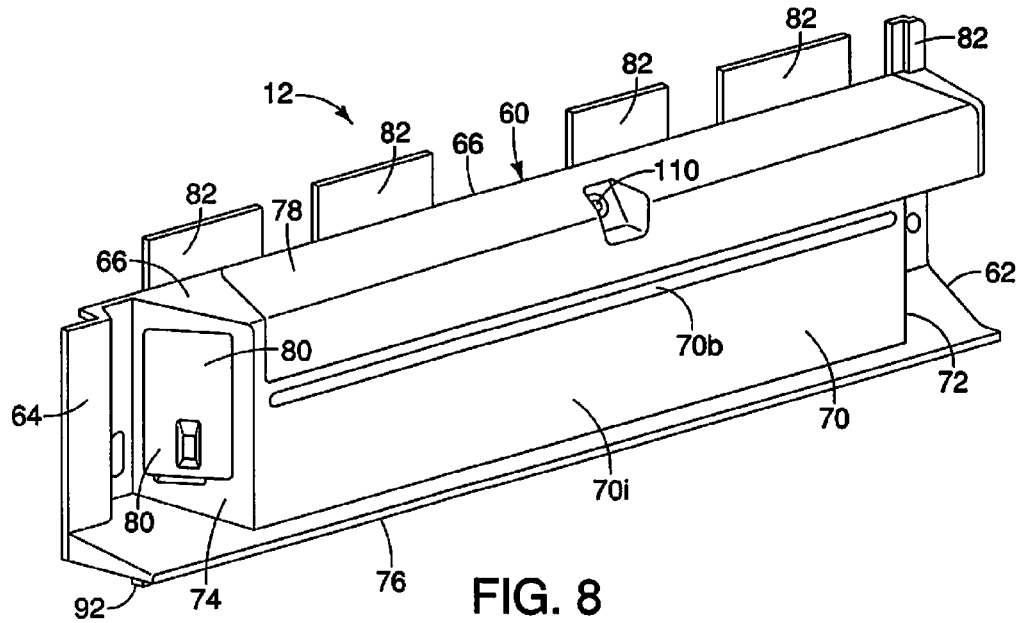
FIG. 8 is a perspective view similar to FIG. 7 showing an inboard side of the storage compartment assembly removed from the side wall in accordance with the first embodiment.

The storage compartment assembly 12 is moveable between an uninstalled orientation (FIGS. 8-15) and an installed orientation (FIGS. 6-7). In the uninstalled orientation, the main body 60 is separated from the side wall 22 and the cargo area 16. In the installed orientation, the outboard panel 66 of the main body 60 is directly fastened to the side wall 22 via fasteners $F_2$, as is described in greater detail below.

Figure 9:
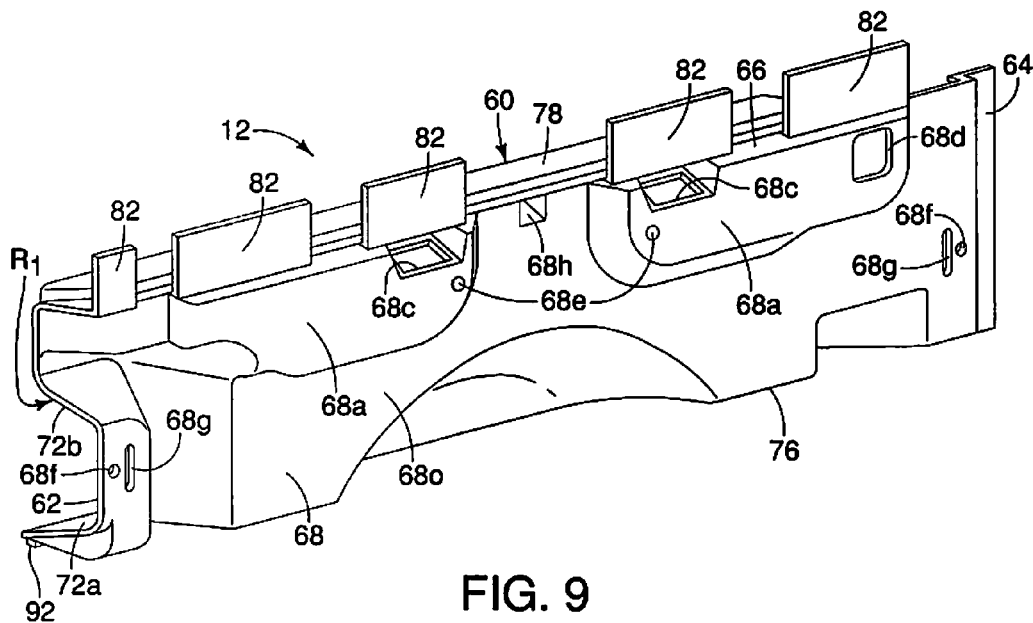
FIG. 9 is a perspective view of the storage compartment assembly removed from the side wall showing an outboard side of the storage compartment assembly in accordance with the first embodiment.
Figure 14:
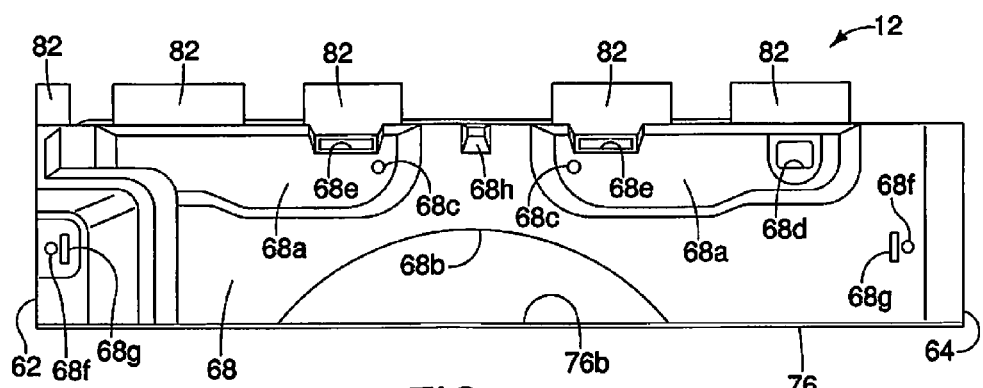
FIG. 14 is an outboard side view of the storage compartment assembly in accordance with the first embodiment.
Figure 15:
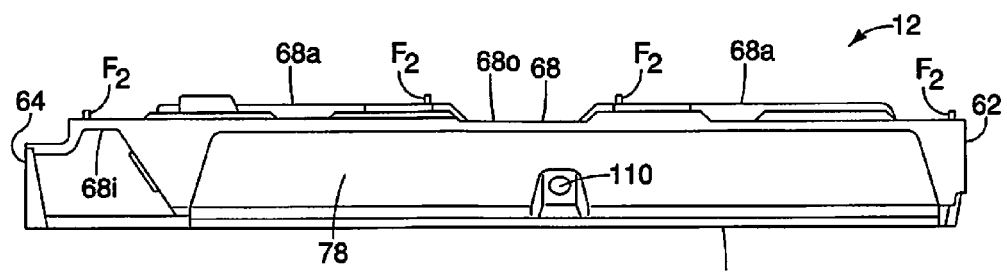
FIG. 15 is a top view of the storage compartment assembly in accordance with the first embodiment.

As shown in FIGS. 9, 14 and 15, the outboard panel 68 includes surface contours such as two outboard projecting embossments 68a and a wheel well receiving recess 68b. With the storage compartment assembly 12 in the installed orientation fixed to the side wall 22, the outboard projecting embossments 68a and a wheel well receiving recess 68b extend into respective ones of the recessed areas 22b. In the depicted embodiment, the outboard projecting embossments 68a are shaped to conform to the overall shape and surface contours of the recessed areas 22b. However, it should be understood from the drawings and the description herein that the outboard projecting embossments 68a need only be shaped and contoured such that they extend into the recessed areas 22b of the side wall 22 without interfering with installation of the storage compartment assembly 12. In other words, the outboard projecting embossments 68a can have any of a variety of shapes and contours to maximize the overall volume of the main storage compartment 84, so long as there is no interference between such shapes and contours with corresponding surfaces of the side wall 22 when installed. The wheel well receiving recess 68b is similarly shaped to receive and cover the wheel well 40 with the storage compartment assembly 12 in the installed orientation fixed to the side wall 22.

Figure 17:
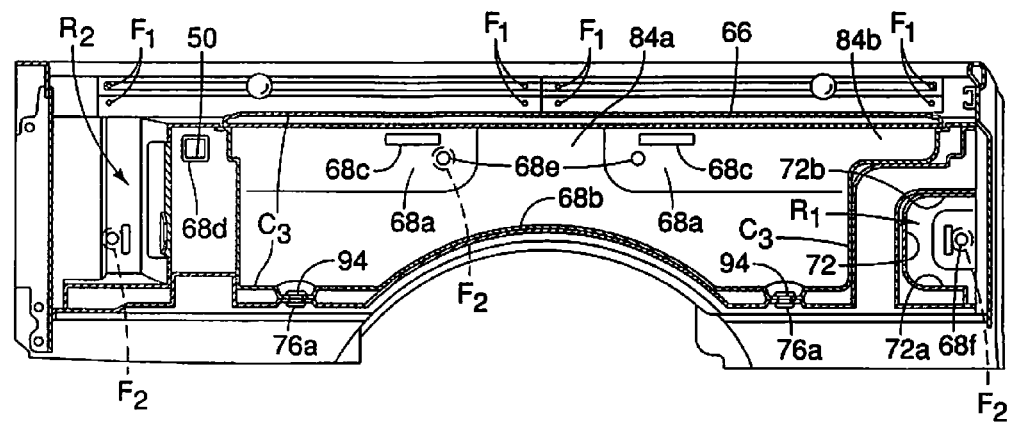
FIG. 17 is a cross-sectional view of storage compartment assembly installed to the side wall of the cargo area taken along the line 17-17 in FIG. 2 showing details of the storage compartment assembly in accordance with the first embodiment.
Figure 18:
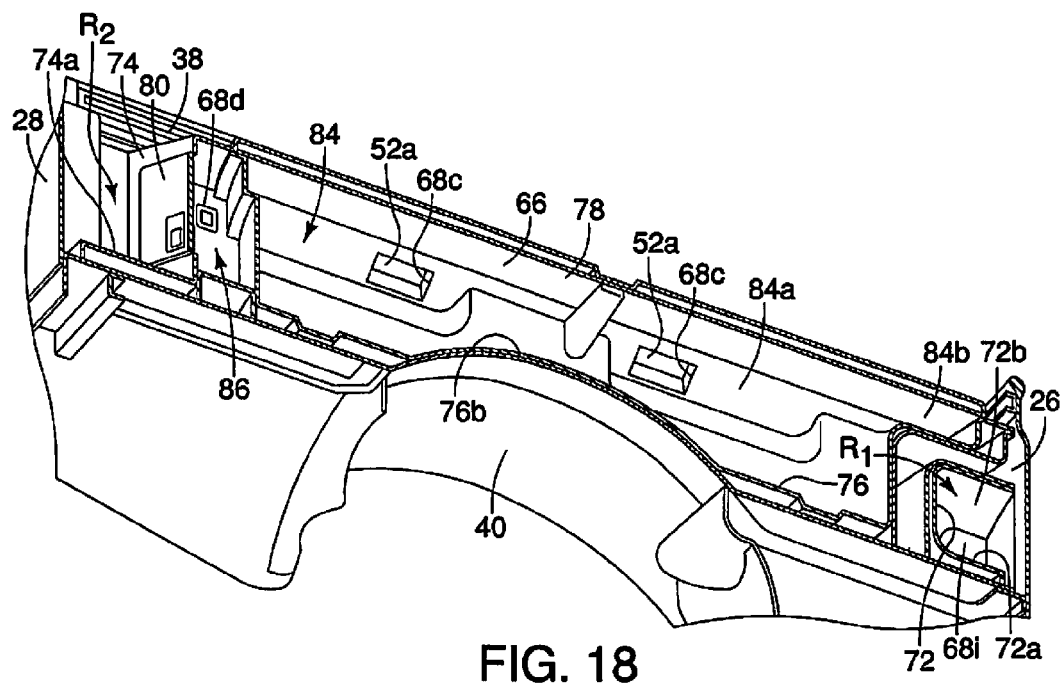
FIG. 18 is a cross-sectional perspective view of the storage compartment assembly installed to the side wall of the cargo area also taken along the line 17-17 in FIG. 2 showing further details of the storage compartment assembly in accordance with the first embodiment.

As shown in FIGS. 9 and 14, the outboard panel 68 is also formed with two light fixture receiving openings 68c, an electric fixture receiving opening 68d, fastener openings 68e and 68f, cargo ring openings 68g and a lock support 68h. The light fixture receiving openings 68c are located at an upper area of the outboard panel 68 and extend from an outboard surface 68o of the outboard panel 68 into the main storage compartment 84, as shown in FIGS. 9, 14 and 17-19. The surface areas of the outboard panel 68 that define the light fixture receiving openings 68c are inclined to align with a lens portion 52a of the light fixture and increase light distribution from the light fixture 52 within the main storage compartment 84, as shown in FIG. 19. As shown in FIGS. 17 and 18, the light fixture receiving openings 68c are located above the wheel well receiving recess 68b and are further located at opposite sides of the wheel well shaped recess 68*b* (forward side and rearward side). As is also shown in FIG. 19, the light fixture receiving openings 68*c* are located such that with the storage compartment assembly 12 in the installed orientation, the light fixtures 52 shine light through the light fixture receiving openings in the main body 60 and illuminate the main storage compartment 84. With the storage compartment assembly 12 in the uninstalled orientation, removed from the cargo area 16, the light fixtures 52 illuminate the cargo area 16.

The electric fixture receiving opening 68*d* extends from the outboard surface 68*o* of the outboard panel 68 into the utility storage compartment 86, as shown in FIGS. 9, 14, 17 and 18. The electric fixture receiving opening 68*d* aligns with the electric outlet 50 with the storage compartment assembly 12 in the installed orientation. As such, the electric outlet 50 is only accessible from within the utility storage compartment 86, as described in greater detail below with a description of the utility storage compartment 86. With the storage compartment assembly 12 in the un-installed orientation the electric outlet 50 is accessible from and open to the cargo area 16.

As shown in FIGS. 9, 14 and 17, the fastener openings 68*e* and 68*f* are provided in the outboard panel 68 of the main body 60 for attaching the storage compartment assembly 12 to the side wall 22. The fastener openings 68*e* extend through the outboard projecting embossments 68*a* into the main storage compartment 84. One of the fastener openings 68*f* is located adjacent to the front end 62 of the main body 60 and extends from the outboard surface 68*o* of the outboard panel 68 to an inboard surface 68*i* exposed in the area of the main body 60 referred to as the first side panel 72. The first side panel 72 is described further below. The other of the fastener openings 68*f* is located adjacent to the rear end 64 of the main body 60 and extends from the outboard surface 68*o* of the outboard panel 68 to the inboard surface 68*i* exposed in the area of the main body 60 referred to as the second side panel 74. The second side panel 74 is also described further below. The fastener openings 68*e* and 68*f* (attachment portions) are positioned to align with the compartment attachment openings 46 (attachment portions) in the side wall 22.

The storage compartment assembly 12 is removably attached to the side wall 22 by fasteners $F_2$ which are inserted from the inboard surface 68*i* of the outboard panel 68 through the fastener openings 68*e* and 68*f*, and further into the compartment attachment openings 46 of the side wall 22. The fasteners $F_2$ are shown in, for example, FIGS. 11, 12, 17 and 19.

Along the inboard surface 68*i*, the fastener openings 68*e* are concealed within the main storage compartment 84. Hence, when two of the fasteners $F_2$ are installed into the fastener openings 68*e*, it is possible to prevent removal of the storage compartment assembly 12. Specifically as is described in greater detail below, the upper lid 78 can be locked to prevent access to the main storage compartment 84. Therefore, with the upper lid 78 locked and the storage compartment assembly 12 in the installed orientation, the fasteners $F_2$ installed via the fastener openings 68*e* are concealed and difficult to access.

The cargo ring openings 68*g* are basically slots that extend through the outboard panel 68 from the outboard surface 68*o* to the inboard surface 68*i*. The cargo ring openings 68*g* are located in order to align with the cargo rings 48 attached to the side wall 22. One of the cargo ring openings 68*g* is located adjacent to the front end 62 of the main body 60 and is open to the area of the main body 60 adjacent to the first side panel 72. As noted above, the first side panel 72 is described further below. The other of the cargo ring openings 68*g* is located adjacent to the rear end 64 of the main body 60 and is exposed in the area of the main body 60 adjacent to the second side panel 74. The second side panel 74 is also described further below. With the storage compartment assembly 12 in the installed orientation, the cargo rings 48 extend through corresponding ones of the cargo ring openings 68*g* in order to receive rope or other materials used to secure cargo within the cargo area 16. The lock support 68*h* is described in greater detail below along with a description of the upper lid 78.

The inboard panel 70 is a generally flat structural member that can be separately formed from the main body 60 and attached there to via fasteners (not shown) or other securing means, such as welding or adhesive materials. The manner of making and securing the inboard panel 70 to the first side panel 72, the second side panel 74 and the bottom panel 76 depends upon the method of manufacturing and/or materials used to construct the storage compartment assembly 12.

The inboard panel 70 has an inboard facing surface 70*i* that can be used to display a manufacturer's logo or name. The upper end of the inboard facing surface 70*i* of the inboard panel 70 includes a hinge attachment section 70*a*, as shown in FIG. 19, for attachment of the upper lid 78, as is described in greater detail below. The upper end of the inboard facing surface 70*i* of the inboard panel 70 also includes an elongated support projection 70*b* adjacent to and below the hinge attachment portion 70*a*, as shown in FIGS. 7-8, 10-12, 19, 22-23, 26-28.

Figure 10:
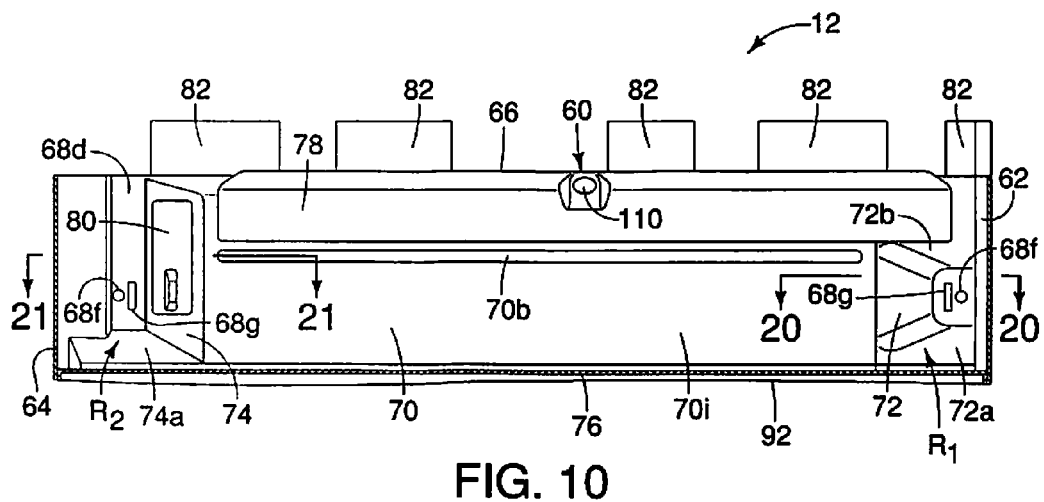
FIG. 10 is an inboard side view of the storage compartment assembly removed from the side wall in accordance with the first embodiment.
Figure 11:
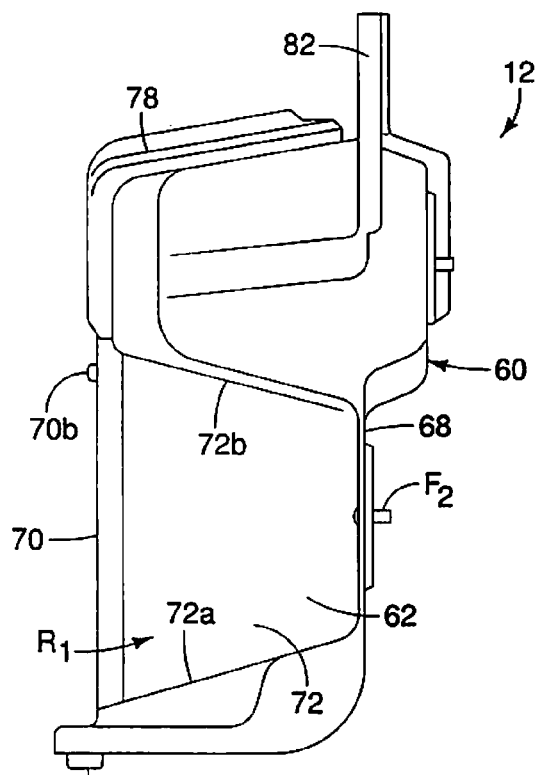
FIG. 11 is a front view of the storage compartment assembly in accordance with the first embodiment.
Figure 12:
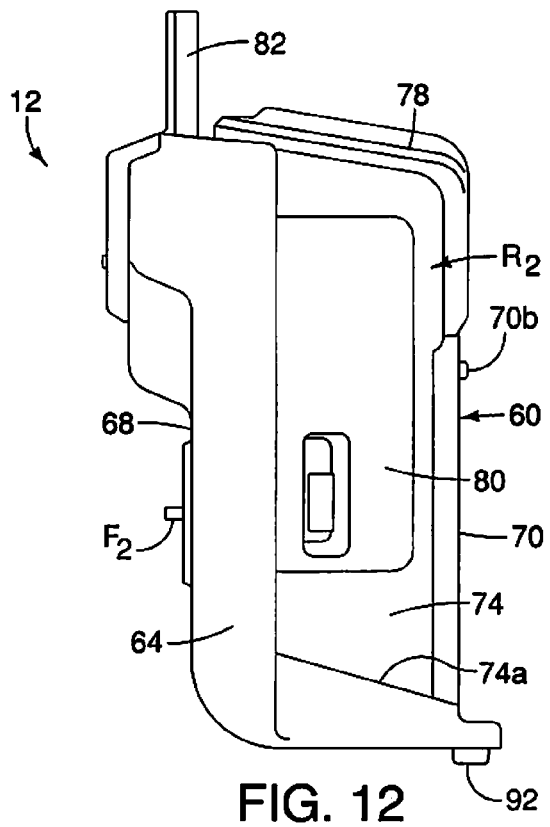
FIG. 12 is a rear view of the storage compartment assembly in accordance with the first embodiment.

The outboard panel 68 is longer than the inboard panel 70 as shown in, for example, FIG. 10. The outboard panel 68 basically spans the entire length of the storage compartment assembly 80 and the side wall 22. The inboard panel 70 is shorter than the outboard panel 68 with the first side panel 72 being located at the front end 62 of the storage compartment assembly 12 and the second side panel 74 being located at the rear end 64 of the storage compartment 12. In other words, the inboard panel 70 extends from the first side panel 72 to the second side panel 74.

A description of the first side panel 72 and the front end 62 of the main body 60 is now provided with specific reference to FIGS. 9, 11 and 17-20. The first side panel 72 is located proximate the front end 62 of the main body 60 and extends from a front edge of the inboard panel 70 to the outboard panel 68. The first side panel 72 attaches to the outboard panel 68 such that a section of the inboard surface 68*i* is uncovered, exposing a corresponding one of the cargo ring openings 68*g* and one of the fastener openings 68*f*, as shown in FIG. 10. The first side panel 72 is not perpendicular to either of the outboard panel 68 or the inboard panel 70. Rather, the first side panel 72 is angled or inclined relative to the outboard panel 68 and the inboard panel 70, as shown in FIG. 19. As shown in FIGS. 9, 11 and 17-20, the first side panel 72 can include a lower section 72*a* and an upper section 72*b*. The first side panel 72, the lower section 72*a* and the upper section 72*b* form a funnel-like shape or conical shape with the cargo ring 48 (and the cargo ring opening 68*g*) being an approximate focal point. The shapes of the visible surfaces of the first side panel 72, the lower section 72*a* and the upper section 72*b* can be curved or straight, and are included to provide non-orthogonal surfaces relative to the cargo ring 48. Specifically, when a rope or other securing means is attached to the cargo ring 48 and extends from the cargo ring 48 into the cargo area 16 at angles that are not perpendicular to the outboard panel 68, it is advantageous to minimize or eliminate contact between the rope and surfaces of the storage compartment assembly 12. The shapes of the first side panel 72, the lower section 72a and the upper section 72b define a first recessed area R₁ (FIG. 10) that is designed to minimize contact with materials attached to the cargo ring 48 that extend into the cargo area 16.

Figure 20:
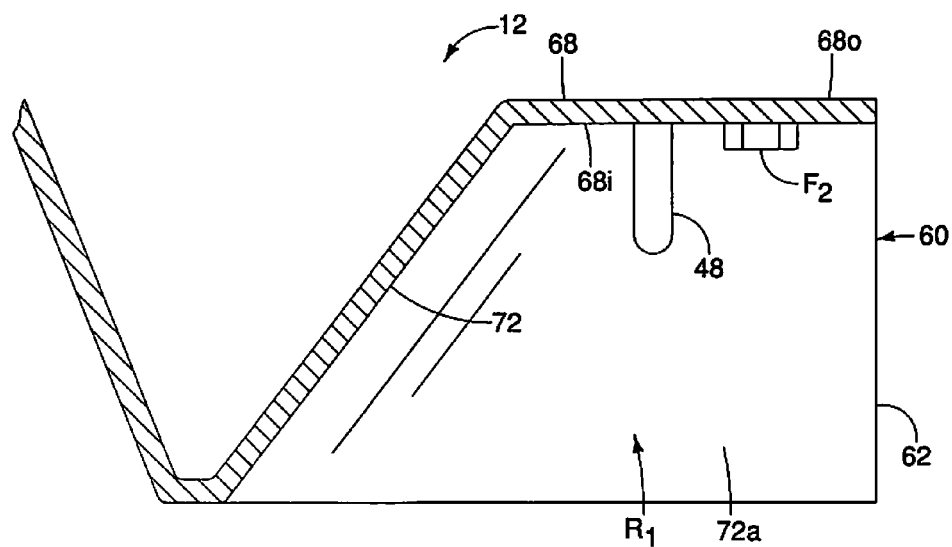
FIG. 20 is a cross-sectional view of a front portion of the storage compartment assembly taken along the line 20-20 in FIG. 10 showing details of a front recessed area of the storage compartment assembly in accordance with the first embodiment.
Figure 21:
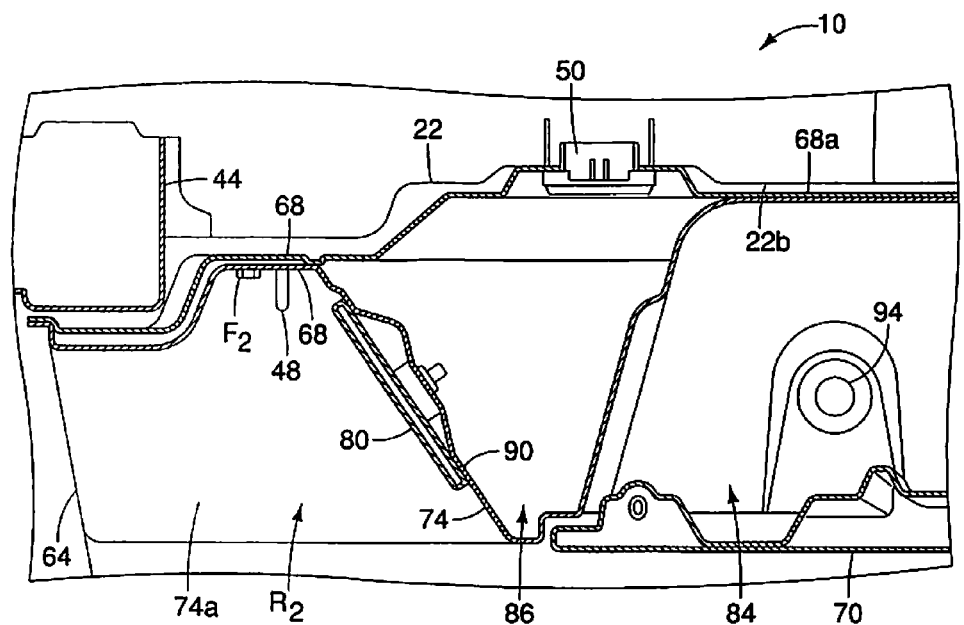
FIG. 21 is a cross-sectional view of a portion of the storage compartment assembly taken along the line 21-21 in FIG. 10 showing details of a rear recessed area of the storage compartment assembly in accordance with the first embodiment.
Figure 22:
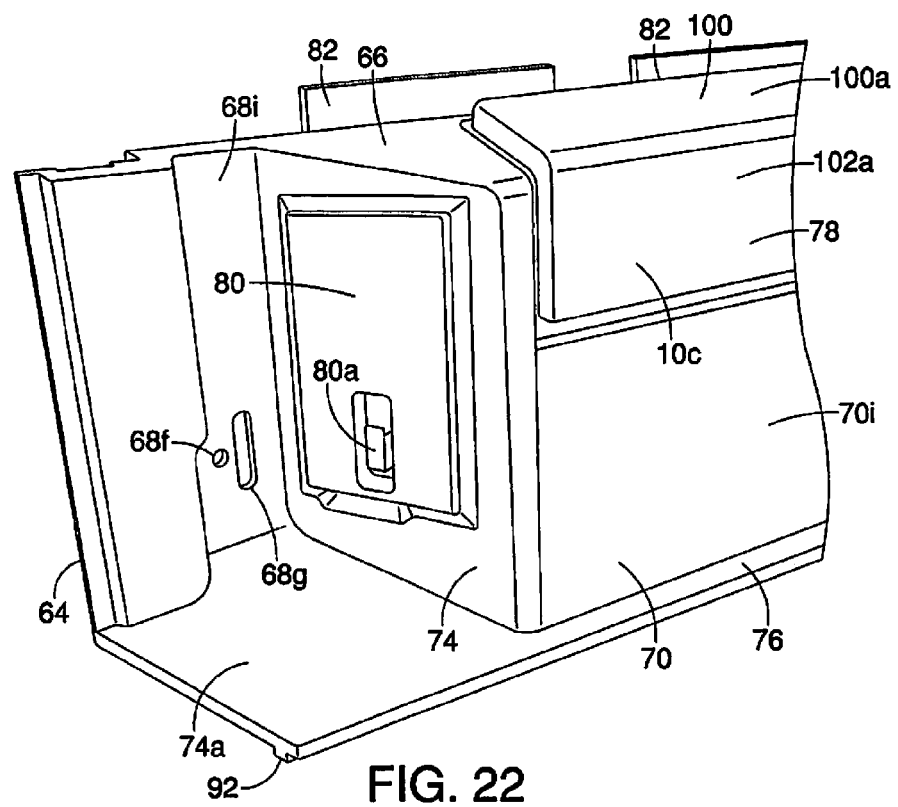
FIG. 22 is a perspective view of the rear recessed area of the storage compartment showing an accessory lid in a closed orientation in accordance with the first embodiment.
Figure 23:
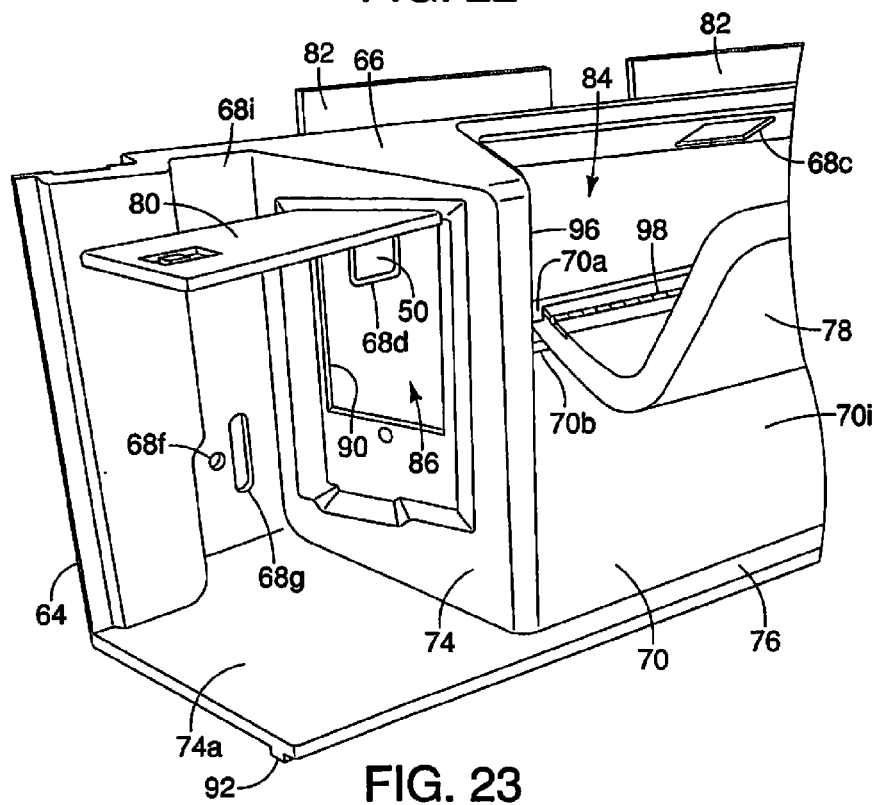
FIG. 23 is another perspective view of the rear recessed area of the storage compartment similar to FIG. 22 showing the accessory lid in an open orientation uncovering a utility storage compartment in accordance with the first embodiment.
Figure 24:
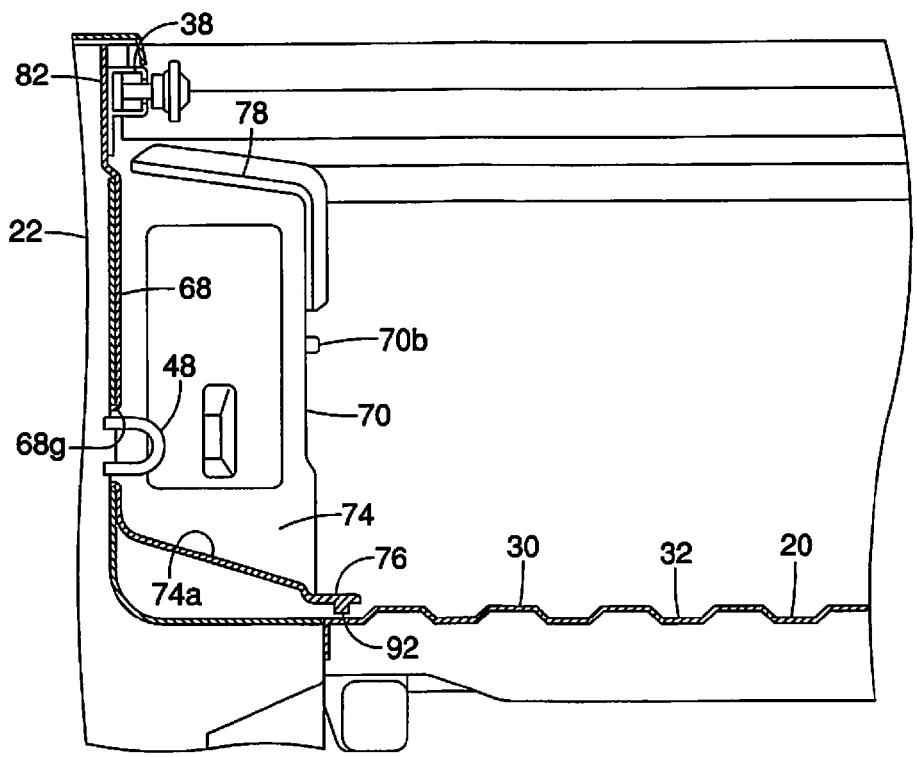
FIG. 24 is a cross-sectional view of the cargo area taken along the lines 24-24 in FIG. 2, showing the rear end of the storage compartment assembly in accordance with the first embodiment.
Figure 25:
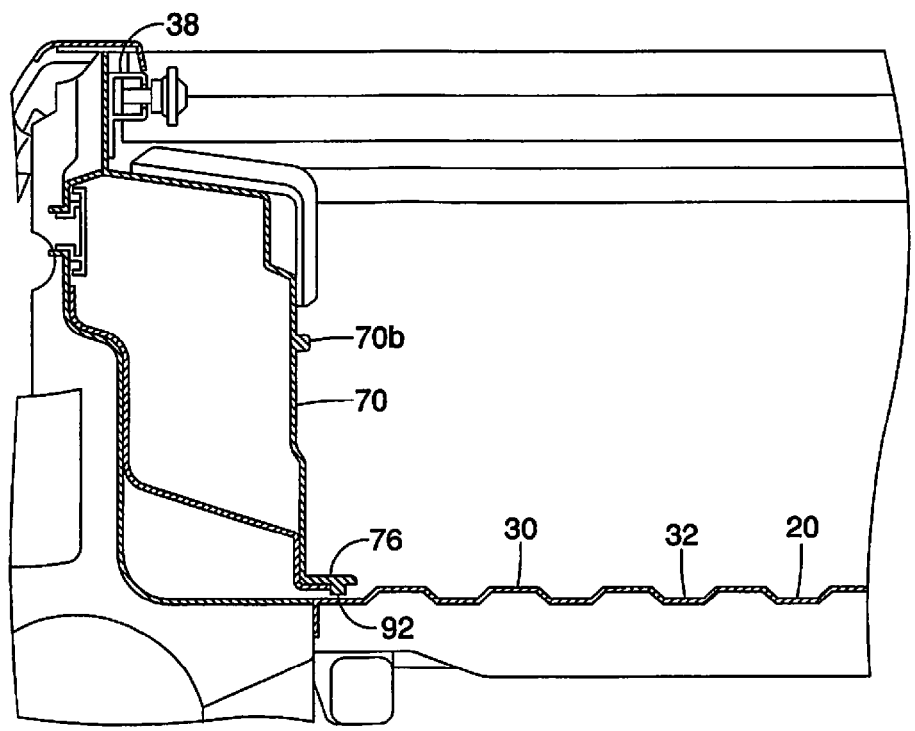
FIG. 25 is a cross-sectional view of the cargo area taken along the lines 25-25 in FIG. 2, showing a forward area of the storage compartment assembly in accordance with the first embodiment.

A description of the second side panel 74 and the rear end 64 is now provided with specific reference to FIGS. 8, 10, 12, 15, 17 and 21-24. The second side panel 74 is located proximate the rear end 64 of the main body 60 and extends from a rear edge of the inboard panel 70 to the outboard panel 68. The second side panel 74 attaches to the outboard panel 68 such that a section of the inboard surface 68i is uncovered, exposing a corresponding one of the cargo ring openings 68g and one of the fastener openings 68f, as shown in FIGS. 10 and 17. The second side panel 74 is not perpendicular to either of the outboard panel 68 or the inboard panel 70. Rather, the second side panel 74 is angled or inclined relative to the outboard panel 68 and the inboard panel 70, as shown in FIG. 20. As shown in FIGS. 10, 17 and 21, the second side panel 74 can include a lower section 74a. The second side panel 74 and the lower section 74a form a partial funnel-like shape or conical shape with the cargo ring 48 (and the cargo ring opening 68g) being an approximate focal point. As shown in FIG. 21, the second side panel 74 defines an obtuse angle with respect to the outboard panel 68. As shown in FIG. 24, the lower section 74a also defines an obtuse angle with respect to the outboard panel 68. The second side panel 74 and the lower section 74a are flat or straight, but can alternatively be curved or contoured. The second side panel 74 is angled relative to the outboard panel 68 and the inboard panel 70 to provide a non-orthogonal surface relative to the cargo ring 48. Specifically, when a rope or other securing means is attached to the cargo ring 48 and extends from the cargo ring 48 into the cargo area 16 at angles that are not perpendicular to the outboard panel 68, it is advantageous to minimize or eliminate contact between the rope and surfaces of the storage compartment assembly 12. The inclined shape of the second side panel 74 defined a second recessed area R₂ (FIG. 10) designed to minimize contact with materials attached to the cargo ring 48 that extend into the cargo area 16.

As shown in FIGS. 22-24, the second side panel 74 is provided with the accessory lid 80 that attaches to the second side panel 74. The accessory lid 80 easily removes from the second side panel 74. The accessory lid 80 can be attached by a hinge (not shown) or can be attached merely by the action of a latch mechanism 80a. For example, as shown in FIGS. 22 and 24, the accessory lid 80 is movable from a closed orientation covering an opening 90 to an open orientation exposing the opening 90, as shown in FIG. 23. As shown in FIG. 23, with the accessory lid 80 in the open orientation (or removed), the utility storage compartment 86 and the electric outlet 50 are accessible. Further, the electric fixture receiving opening 68d is open to the utility storage compartment 86. Therefore, with the accessory lid 80 open or removed, the electric fixture receiving opening 68d is easily accessed.

As shown in FIGS. 17 and 18, the second side panel 74 extends to the top of the storage compartment assembly 12. The first side panel 74 only extends part way toward the top of the storage compartment assembly 12.

A description of the bottom panel 76 of the main body 60 of the storage compartment assembly 12 is now provided with reference to FIGS. 8, 11-12, 13, 17, 19 and 22-23. The bottom panel 76 is fixedly attached or formed with the outboard panel 68, the first side panel 72 and the second side panel 74. Further, the bottom panel 76 extends between the inboard panel 70 and the outboard panel 68. As mentioned above, the inboard panel 70 is separately attached to the bottom panel 76, the first side panel 72 and the second side panel 74. However, in an alternative embodiment, the bottom panel 76 and the inboard panel 70 can be formed or manufactured in a unitary, monolithic manner.

Figure 13:
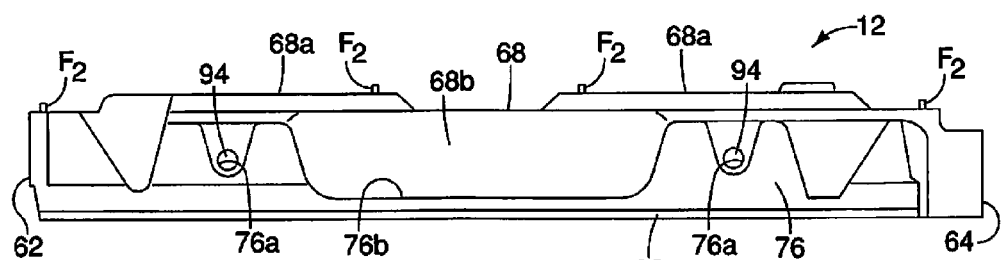
FIG. 13 is a bottom view of the storage compartment assembly in accordance with the first embodiment.

As shown in FIGS. 8, 11-12, 13, 19 and 22-23, the bottom panel 76 includes a projection or rib 92. As shown in FIG. 13, the rib 92 extends approximately the full length of the bottom panel 76. As shown in FIG. 19, the rib 92 is located within one of the recesses 30 defined along the floor 20.

As shown in FIGS. 2, 13 and 17, the bottom panel 76 is also formed with a pair of drain openings 76a plugged with removable drain plugs 94. Further, as shown in FIGS. 13, 14 and 17, the bottom panel 76 includes a wheel well recess 76b joined with the wheel well receiving recess 68b of the outboard panel 68.

A description of the upper lid 78 and the upper end 66 of the main body 60 of the storage compartment assembly 12 is now provided with specific reference to FIGS. 22, 23 and 26-32. The upper lid 78 is movable between a closed orientation (FIGS. 1-3, 6-8, 10-12, 19, 22 and 28-29) and an open orientation (FIGS. 23, 26 and 30-32). In the open orientation, the upper lid 78 exposes an opening 96 (a lid opening) defined at the upper end 66 of the main body 60. The opening 96 is open to and provides access to the main storage compartment 84, described in greater detail below. Specifically, the opening 96 extends from an outer surface of the upper end 66 the main body 60 to the main storage compartment 84.

Figure 26:
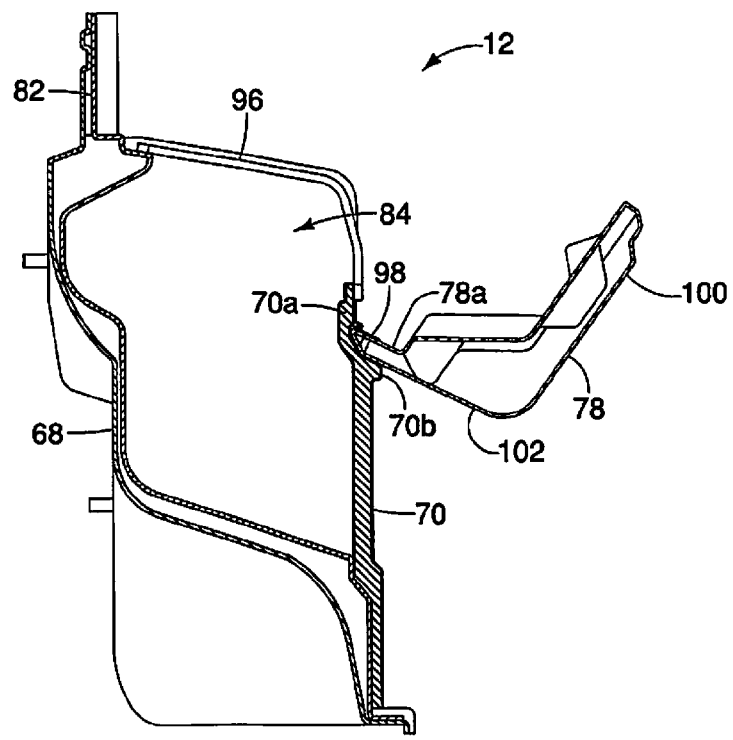
FIG. 26 is a cross-sectional view of the storage compartment assembly showing the lid in the open orientation in accordance with the first embodiment.
Figure 27:
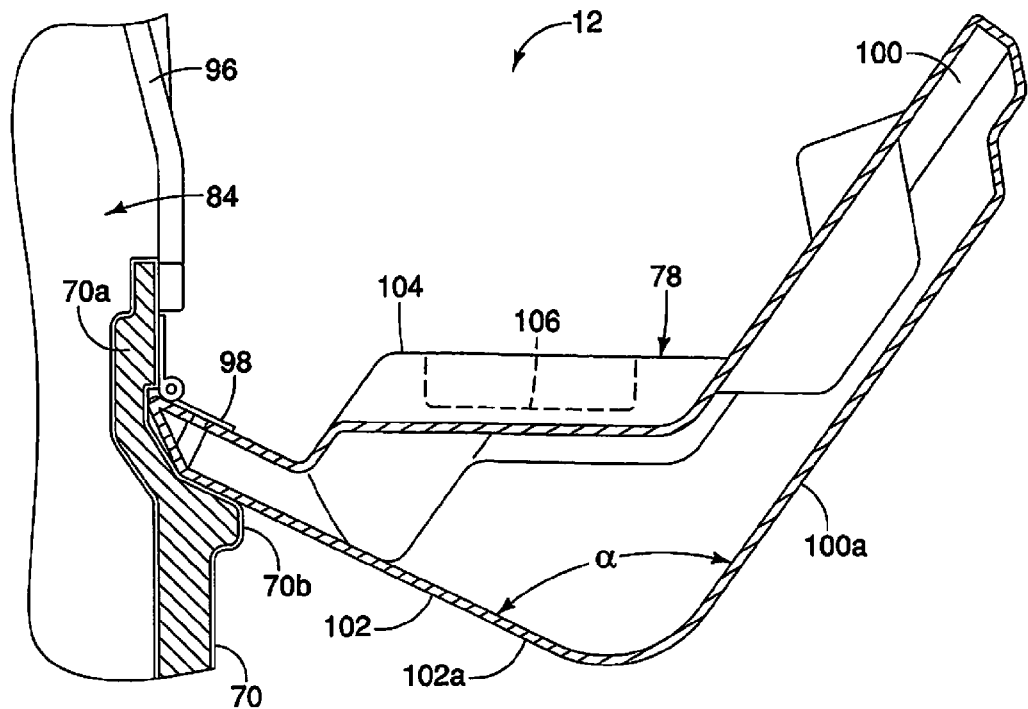
FIG. 27 is an enlarged cross-sectional view of the storage compartment assembly showing the lid in the open orientation in accordance with the first embodiment.

The upper lid 78 is attached to the upper end of the inboard panel 70 by a hinge 98 (a hinge mechanism). The hinge 98 is fixed to the hinge attachment section 70a and to an inner surface 78a of the upper lid 78, and allows the upper lid 78 to pivot between the closed orientation (FIG. 22) and the open orientation (FIGS. 23 and 26-27). The hinge 98 extends in a direction parallel to the side wall 22 with the storage compartment assembly 12 in the installed orientation.

In the depicted embodiment, the hinge 98 is a single elongated hinge mechanism. However, it should be understood from the drawings and the description herein that the hinge 98 can be a plurality of separate hinge mechanisms that provide the upper lid 78 with pivoting capability.

As shown in FIGS. 26-32, the upper lid 78 basically includes a first lid portion 100 and a second lid portion 102 that are rigidly fixed together. In the depicted embodiment, the first lid portion 100 and the second lid portion 102 are unitarily formed as a one piece unitary monolithic element by, for example, a molding process. The first lid portion 100 has a first outer surface 100a and a first inner surface 100b, and the second lid portion 102 has a second outer surface 102a and a second inner surface 102b. The first outer surface 100a and the second outer surface 102a are angularly offset from one another defining an angle α therebetween as viewed from an end thereof in FIG. 27 that is an obtuse angle greater than 90 degrees and less than 125 degrees. With the upper lid 78 in the closed orientation, the first outer surface 100 is inclined in a downward direction from an outboard side to an inboard side thereof. In the closed orientation, the second outer surface 102a is upright. With the upper lid 78 in the open orientation the first and second outer surfaces 100a and 102a are both inclined relative to horizontal.

As shown in FIGS. 26 and 27, with the upper lid 78 in the open orientation, the second outer surface 102a of the second lid portion of the upper lid 78 contacts and is supported by the elongated support projection 70b. More specifically, the elongated support projection 70b acts as a stop preventing the upper lid 78 from moving any further about the hinge 98 than the position and orientation shown in FIGS. 26 and 27 when in the open orientation.

The first inner surface 100b and the second inner surface 102b face the utility storage compartment 84 with the upper lid 78 in the closed orientation, as shown in FIG. 19. As shown in FIGS. 27 and 30-32, the first inner surface 100b and the second inner surface 102b also include shaped, molded or embossed sections 104 that define cup holder recesses 106. With the upper lid 78 in the open orientation, the cup holder recesses are horizontally oriented. There are four cup holder recesses 106 shown in the drawings. However, it should be understood from the drawings and description herein that any number of cup holders 106 can be included on the upper lid 78, space permitting.

Figure 28:
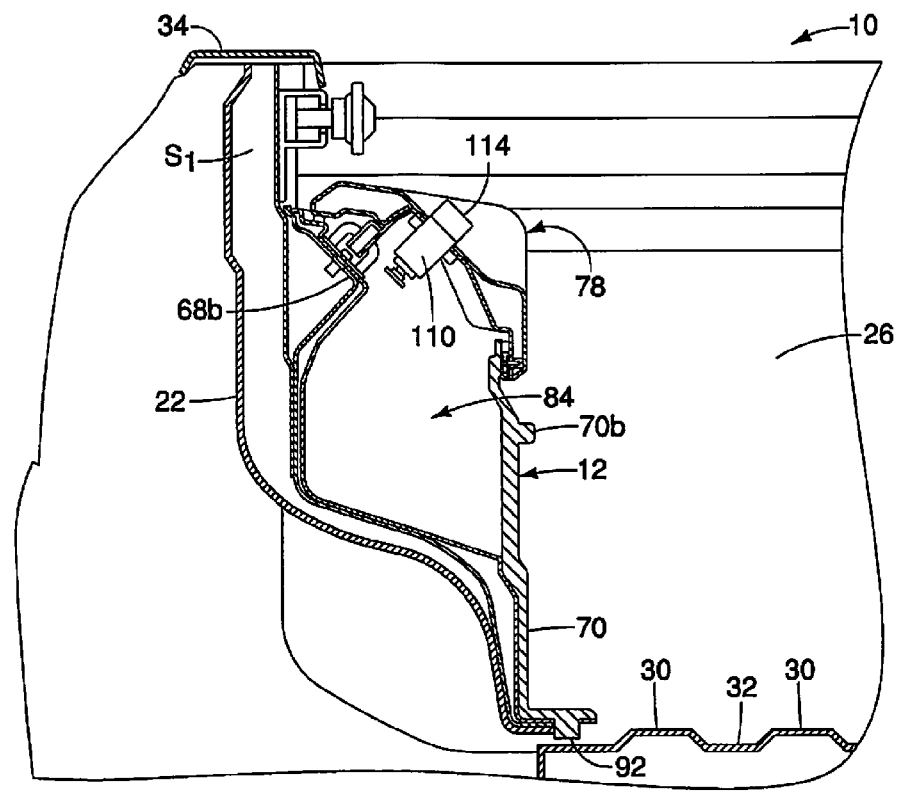
FIG. 28 is a cross-sectional view of the cargo area and the storage compartment assembly taken along the line 28-28 in FIG. 2, showing details of a locking mechanism of the lid in accordance with the first embodiment.
Figure 29:
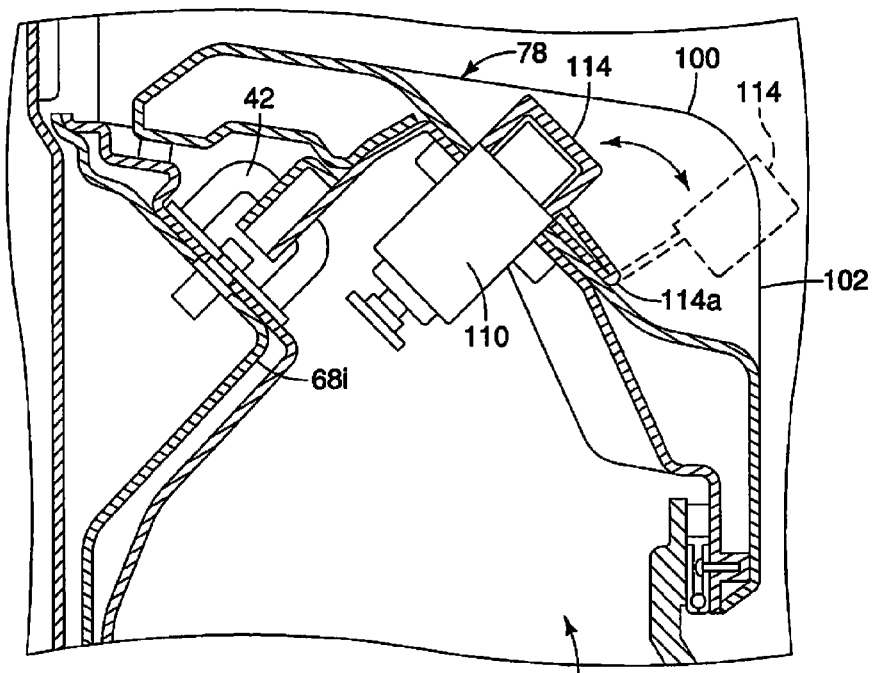
FIG. 29 is an enlarged cross-sectional view of the cargo area and the storage compartment assembly similar to FIG. 28, showing details of the locking mechanism of the lid in accordance with the first embodiment.
Figure 30:
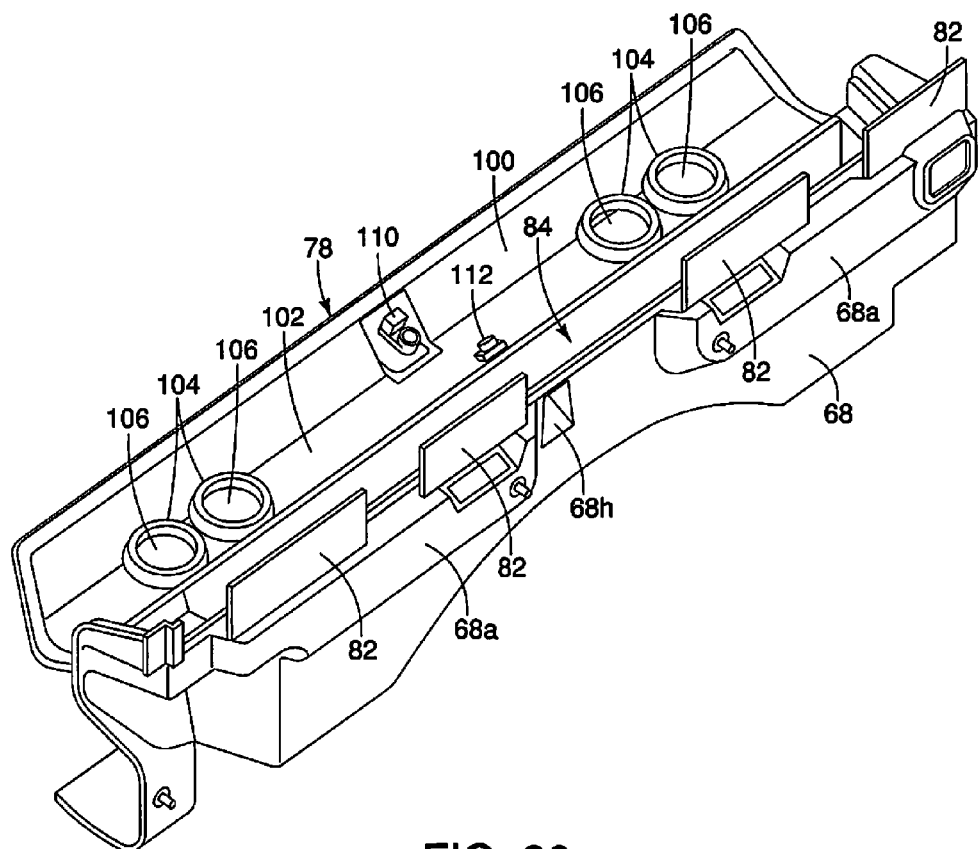
FIG. 30 is a perspective view of the storage compartment assembly removed from the cargo area showing the outboard side of the storage compartment assembly with the lid in the open orientation in accordance with the first embodiment.
Figure 31:
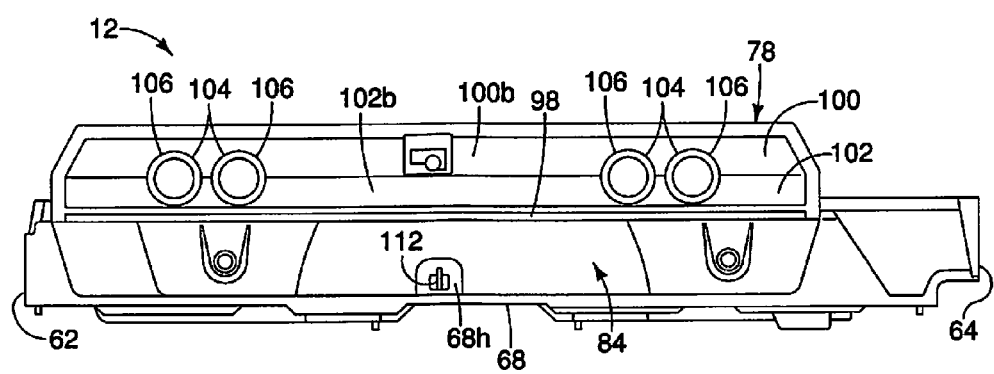
FIG. 31 is a top view of the storage compartment assembly removed from the cargo area showing the lid in the open orientation in accordance with the first embodiment.
Figure 32:
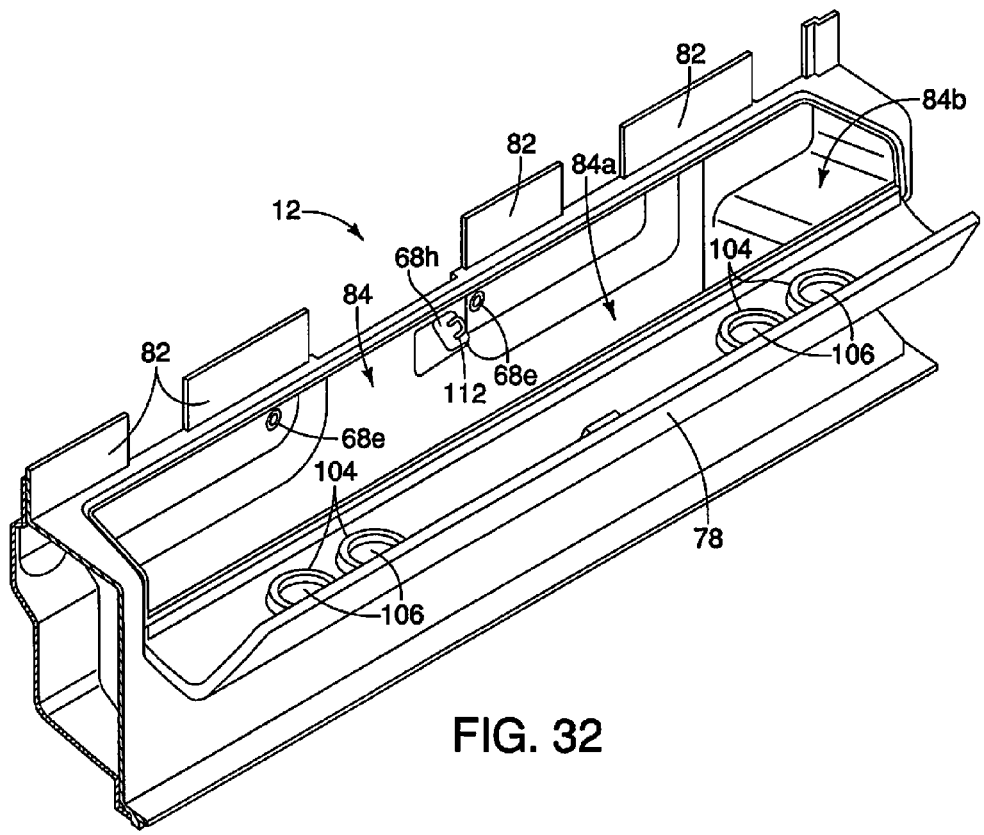
FIG. 32 is another perspective view of the storage compartment assembly removed from the cargo area showing the inboard side of the storage compartment assembly with the lid in the open orientation in accordance with the first embodiment.

As shown in FIGS. 28 and 29, the upper lid 78 also includes a locking mechanism 110 operable between a locking orientation and an unlocked orientation. A striker bar 112 is rigidly fixed to the lock support 68h in a conventional manner. The locking mechanism 110 is configured to engage the striker bar 112 in the locking orientation (FIGS. 28 and 29) and disengage the striker bar 112 in the unlocked orientation (FIGS. 30 and 31).

The locking mechanism 110 can be provided with a protective cover 114. The protective cover 114 is attached to the locking mechanism 110 via a living hinge 114a. The protective cover 114 is movable between a covering orientation covering the locking mechanism as shown in FIGS. 28 and 29 in solid lines and an uncovered orientation exposing the locking mechanism 114 as shown in FIG. 29 in phantom lines.

A description of the upwardly extending flanges 82 (upward projections) is now provided. The flanges 82 extend from the upper end 66 of the storage compartment assembly 12 and can be unitarily formed with the outboard panel 68. In the depicted embodiment there are four flanges 82. With the storage compartment assembly 12 installed to the side wall 22, the flanges 82 extend into the space $S_1$, as shown in FIG. 19. The flanges 82 are spaced apart from one another defining gaps therebetween. The gaps between the flanges 82 align with the three upper sections 22c of the main portion 22a of the side wall 22. The utility attachment track 38 attaches to the three upper sections 22c of the side wall 22. The flanges 82 are spaced apart from one another in order to fit in between the three upper sections 22c and within the recessed areas 22b. More specifically, the space $S_1$ is defined in the areas corresponding to the upper regions of the recessed areas 22b.

The main body 60 of the storage compartment assembly 12 is divided into two portions that are defined relative to the utility attachment track 38. As shown in FIG. 19, the flanges 82 and the outboard projecting embossments 68a of the main body 60 are basically located outboard relative to the utility attachment track 38. The remainder of the main body 60, including the inboard panel 70 and the upper lid 78 are located inboard relative to the utility attachment track 38.

The configuration and design of the exterior features of the storage compartment assembly 12 provide many advantages. For example, since the flanges 82 extend upwardly into the space $S_1$ adjacent to the overhanging portion 36 and the utility attachment track 38, contact between the flanges 82 and the utility attachment track 38 restricts movements of the upper end 66 of the main body 60 in the inboard direction $D_2$ with the storage compartment assembly in the installed orientation.

Further, the bottom panel 76 includes the rib 92. The rib 92 is basically an elongated projection that inserts into one of the recesses 32 on the surface of the floor 20 with the storage compartment assembly 12 in the installed orientation. The rib 92 further prevents movement of the storage compartment assembly 12 in the inboard direction $D_2$ with the storage compartment assembly 12 in the installed orientation.

The storage compartment assembly 12 is installed by placing the storage compartment assembly 12 on the floor 20 of the cargo area 16, inclining the upper end 66 of the main body 60 toward the side wall 22 and inserting the flanges 82 into the spaces $S_1$ behind the utility attachment track 38. The storage compartment assembly 12 is then lifted from the bottom panel 76, and simultaneously pushed upward to move the flanges 82 into the space $S_1$ and pushing the bottom panel 76 in an outboard direction until the rib 92 is located in the recess 32. Thereafter, the fasteners $F_2$ can be installed to fixedly attach to the outboard panel 68 to the side wall 22. In order to remove the storage compartment assembly 12 from the cargo area 16, the operations above are reversed.

As shown in FIG. 23 with the upper lid 78 in the open orientation, the light fixtures 52 and the light fixture receiving openings 68c are exposed. With the upper lid 78 in the closed orientation, the light fixtures 52 and the light fixture receiving openings 68c are concealed.

As is also shown in FIG. 23, the light fixture receiving openings 68c are defined at the upper end 66 of the main body 60 proximate the opening 96. Further, as shown in FIG. 19, the light fixture 52 is mounted to the side wall 22 at a position above the light fixture receiving openings 68c with at least a portion of the light fixture 52 being located vertically higher than the lid 78. Further the portions of the outboard panel 68 having the outboard projecting embossments 68a and the upwardly extending flanges 82 are located outboard relative to the utility attachment track 38. The lid 78, the opening 96 and the inboard panel 70 are all located inboard relative to the utility attachment track 38.

A description is provided of the interior spaces within the storage compartment assembly 12. Specifically, the storage compartment assembly 12 includes the main storage compartment 84 and the utility storage compartment 86. As shown in FIGS. 17 and 18, the main storage compartment 84 includes a main section 84a and a shelf section 84b. The main section 84a extends from the bottom panel 76 of the main body 60 to an upper end 66 of the main body 60. The shelf section 84b is defined above the first recessed area $R_1$ and is open to the main section 84a. The shelf section 84b can be utilized when a long tool is stored within the main section 84a, with, for example, a handle section of the tool being disposed within the shelf section 84b. Alternatively, the shelf section 84b can be used for storing small tools or small equipment.

The outboard panel 68 includes the outboard projecting embossments 68a. The outboard projecting embossments 68a serve to increase the storage volume (and capacity) of the main section 84a of the main storage compartment 84.

The utility storage compartment 86 has an overall volume that is much smaller than the overall volume of the main storage compartment 84. However, the utility storage compartment 86 is included for a variety of purposes. For example, as described above, the electric outlet 50 is accessed via the opening 90 in the second side panel 74. The electric outlet 50 is concealed and protected by the removable accessory lid 80. The volume of the utility storage compartment 86 is suited for storing extension cords and/or small electric tools.

Second Embodiment

Figure 33:
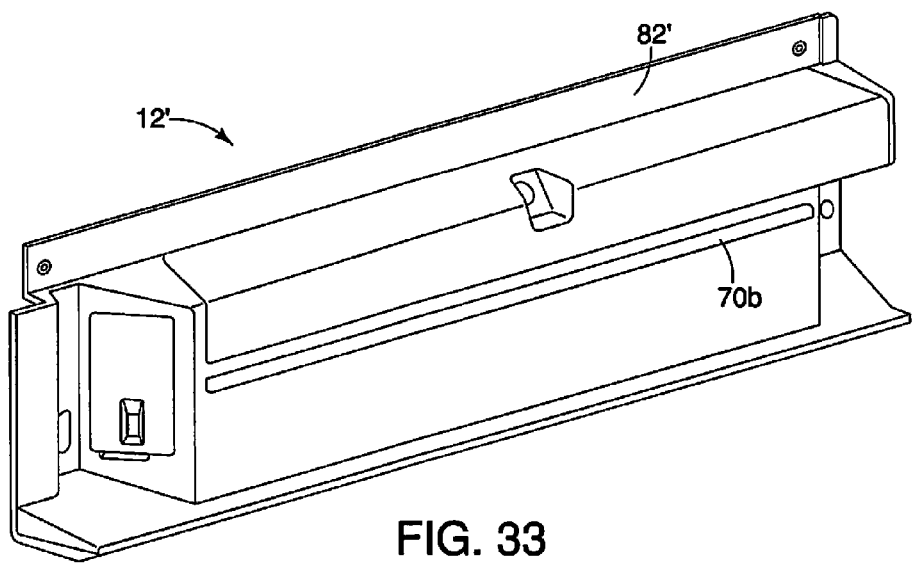
FIG. 33 is a perspective view of a storage compartment assembly in accordance with a second embodiment.
Figure 34:
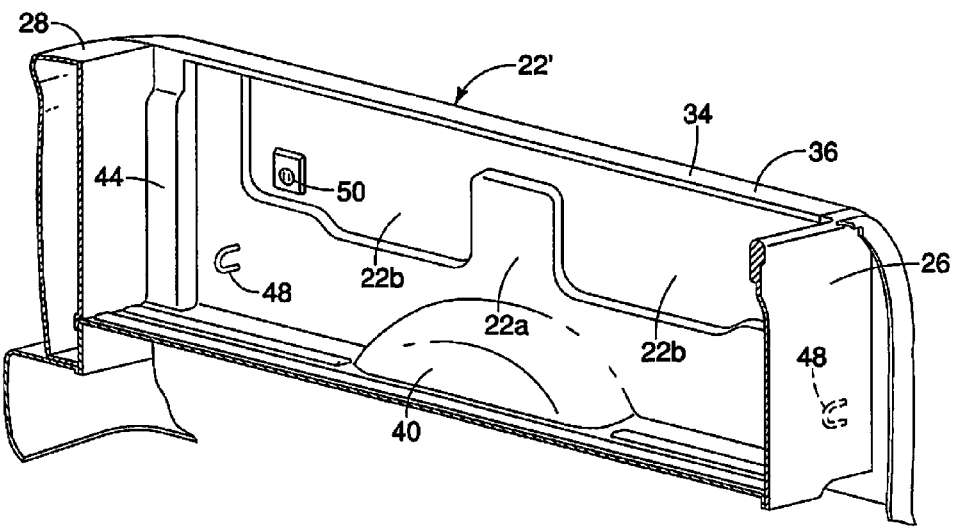
FIG. 34 is a perspective cross-sectional view of a side wall of the rear structure that defines a cargo area with the storage compartment assembly removed showing features of the side wall including an electric outlet in accordance with the second embodiment.
Figure 35:
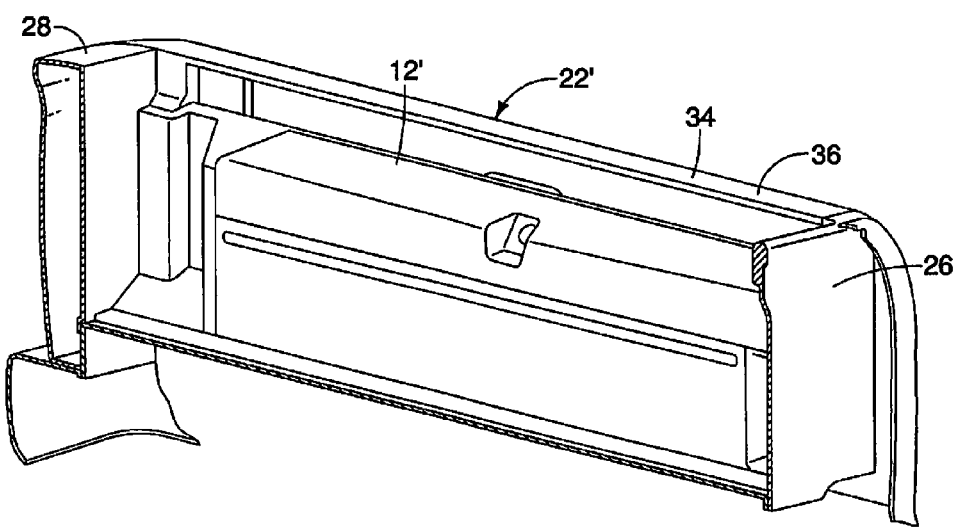
FIG. 35 is another perspective cross-sectional view of the side wall of the rear structure that defines the cargo area similar to FIG. 34 with the storage compartment assembly installed in accordance with the second embodiment.

Referring now to FIGS. 33-35, a storage compartment assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The storage compartment assembly 12' is identical to the storage compartment assembly 12 of the first embodiment with respect to all aspects and features, except that the flanges 82 of the first embodiment have been modified to include only a single elongated flange 82'. The storage compartment assembly 12' is intended for installation to a side wall 22' that does not include a utility attachment track, such as the utility attachment track 38 of the first embodiment. Specifically, the side wall 22' is shown in FIG. 34 without the storage compartment assembly 12' being installed. The side wall 22' is identical in all aspects and features to the side wall 22 of the first embodiment, except that there is no utility attachment track present. The storage compartment assembly 12' is shown installed to the side wall 22' in FIG. 35.

Third Embodiment

Figure 36:
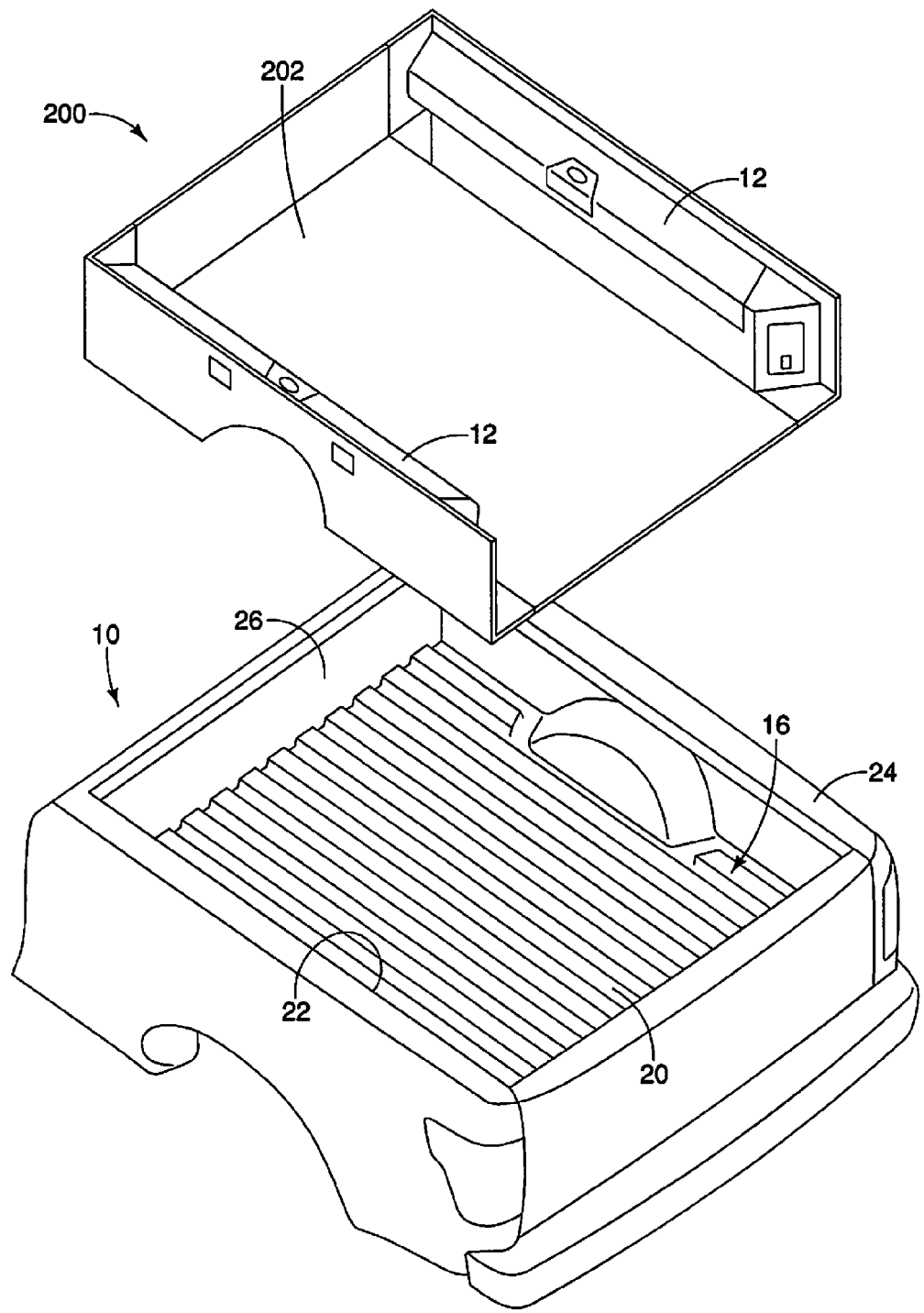
FIG. 36 is a schematic perspective view of a cargo area, a pair of storage compartment assemblies and a cargo bed liner in accordance with a third embodiment.

Referring now to FIG. 36, a cargo area assembly 200 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The cargo area assembly 200 includes two of the storage compartment assemblies 12 as described above in the first embodiment, but further includes a floor and front wall liner 202 that mate with the storage compartment assemblies 12 to cover the various surfaces of the cargo area 16 of the vehicle 10. Specifically, the cargo area assembly 200 covers the floor 20, the interior surfaces of the side walls 22 and 24 and the interior surface of front wall 26 once installed to the cargo area 16.

Various features of the vehicle 10 and structure of the cargo area 16 are conventional components that are well known in the art. Since such conventional vehicle and cargo area structures are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the storage compartment assembly. Accordingly, these terms, as utilized to describe the present invention should be interpreted relative to a vehicle equipped with the storage compartment assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle storage compartment assembly comprising:
   a vehicle body structure including a floor and a side wall that at least partially define a vehicle cargo area, the side wall having an upper end structured with an overhanging portion that extends inboard from the side wall above the floor, the side wall having an inboard surface that is vertically oriented, the inboard surface facing the vehicle cargo area with a cargo ring rigidly fixed to the inboard surface and extending into the vehicle cargo area; and
   a storage compartment assembly having a main body including an inboard panel and an outboard panel spaced apart from one another and fixedly coupled to one another defining a storage compartment therebetween, the outboard panel being vertically oriented, the storage compartment assembly being moveable between an uninstalled orientation in which the main body is separated from the side wall and an installed orientation in which the outboard panel of the main body is fastened directly to the side wall, and with the storage compartment assembly in the installed orientation at least a first portion of the main body extends under the overhanging portion and a second portion of the main body extends inboard relative to the overhanging portion over an area of the floor, the storage compartment assembly includes a recessed area, the outboard panel having a portion that includes a ring receiving opening exposed within the recessed area with the cargo ring extending through the opening and into the recessed area with the storage compartment assembly in the installed orientation, such that the cargo ring is exposed to the vehicle cargo area, the recessed area being defined by a first side panel, an upper section, a lower section and the portion of the outboard panel having the ring receiving opening, the first side panel, the upper section and the lower section being inclined relative to one another such that the first side panel, the upper section and the lower section converge toward one another in a direction going toward the portion of the outboard panel having the ring receiving opening with curved surfaces being provided in areas between the first side panel and the upper section, and the first side panel and the lower section, with a side area of the recessed area opposite the first side panel being open providing access to the cargo ring, the storage compartment includes a main section and a shelf section, the main section extending from a bottom of the main body to an upper end of the main body, and the shelf section being defined above the recessed area and being open to the main section.

2. The vehicle storage compartment assembly according to claim 1, wherein the first side panel extends from the portion of the outboard panel having the opening to the inboard panel with an obtuse angle being defined between defined between the first side panel and the portion of the outboard panel having the opening.

3. The vehicle storage compartment assembly according to claim 1, wherein the floor includes a plurality of longitudinally extending ribs and corresponding recesses defined between the ribs, and a lower end of the second portion of the storage compartment assembly includes an elongated projection that is inserted into one of the recesses with the storage compartment assembly in the installed orientation.

4. The vehicle storage compartment assembly according to claim 1, wherein the overhanging portion includes a utility attachment track extending downward therefrom defining a space between an upper portion of the side wall and the utility attachment track; and an upper end of the first portion of the storage compartment assembly includes at least one upwardly extending projection that extends upwardly adjacent to the overhanging portion within the space between the upper end of the side wall and the utility attachment track such that the utility attachment track restricts movement of the upper end in an inboard direction with the storage compartment assembly in the installed orientation.

5. The vehicle storage compartment assembly according to claim 4, wherein the utility attachment track includes a plurality of attachment sections fixed to corresponding sections of the side wall, and the at least one upwardly extending projection is segmented into a plurality of upwardly extending projections with gaps defined between adjacent ones of the plurality of upwardly extending projections, the gaps being located and dimensioned to receive the attachment sections of the utility attachment track.

6. The vehicle storage compartment assembly according to claim 1, wherein the first portion of the storage compartment assembly includes an upper end having a single upwardly extending flange that extends continuously from a first end of the storage compartment assembly to a second end of the storage compartment assembly.

7. The vehicle storage compartment assembly according to claim 1, wherein the floor and the side wall include an area therebetween that defines a wheel well that extends into the vehicle cargo area, and the outboard panel of the main body includes a wheel well shaped recess that overlays the wheel well with the storage compartment assembly in the installed orientation.

8. The vehicle storage compartment assembly according to claim 1, wherein the side wall includes a plurality of first attachment portions, and the outboard panel includes a plurality of second attachment portions that align with corresponding ones of the first attachment portions with the storage compartment assembly in the installed orientation, such that with the plurality of second attachment portions connected to corresponding ones of the first attachment portions, the storage compartment assembly is fixedly attached to the side wall.

9. The vehicle storage compartment assembly according to claim 8, wherein the storage compartment assembly includes a lid and a locking mechanism, the lid being movable between an open orientation exposing a storage compartment within the storage compartment assembly and a closed orientation concealing the storage compartment and concealing the plurality of second attachment portions of the outboard panel, and the locking mechanism is operable between a locked orientation and an unlocked orientation such that with the locking mechanism in the locked orientation the lid is prevented from moving from the closed orientation.

10. The vehicle storage compartment assembly according to claim 1, wherein the storage compartment assembly includes a bottom panel extending between the inboard panel and the outboard panel, the bottom panel defining a drain opening having a removable drain plug.

* * * * *